US010860146B2

(12) United States Patent
Kim et al.

(10) Patent No.: US 10,860,146 B2
(45) Date of Patent: Dec. 8, 2020

(54) ELECTRONIC DEVICE HAVING A PLURALITY OF PIEZOELECTRIC ELEMENTS

(71) Applicant: Samsung Electronics Co., Ltd., Suwon-si (KR)

(72) Inventors: Moonsoo Kim, Seoul (KR); Jaehyung Park, Suwon-si (KR); Seunggeol Baek, Suwon-si (KR); Chihyun Cho, Yongin-si (KR); Hochul Hwang, Suwon-si (KR); Yunjang Jin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 15/922,343

(22) Filed: Mar. 15, 2018

(65) Prior Publication Data
US 2018/0267673 A1    Sep. 20, 2018

(30) Foreign Application Priority Data
Mar. 16, 2017    (KR) .......................... 10-2017-0033264

(51) Int. Cl.
*G06F 3/043*    (2006.01)
*G06K 9/00*    (2006.01)

(52) U.S. Cl.
CPC .......... *G06F 3/0433* (2013.01); *G06F 3/0436* (2013.01); *G06K 9/0002* (2013.01)

(58) Field of Classification Search
CPC .... G06F 3/0433; G06F 3/0436; G06K 9/0002
See application file for complete search history.

(56) References Cited

U.S. PATENT DOCUMENTS

| 4,791,416 | A | * | 12/1988 | Adler | .................... G06F 3/0436 310/313 D |
| 2006/0274905 | A1 | * | 12/2006 | Lindahl | .................... H04R 5/04 381/61 |
| 2010/0110273 | A1 | | 5/2010 | Turbahn et al. | |
| 2010/0156818 | A1 | * | 6/2010 | Burrough | ................ G06F 3/041 345/173 |
| 2013/0127755 | A1 | | 5/2013 | Lynn et al. | |
| 2013/0201134 | A1 | | 8/2013 | Schneider et al. | |

(Continued)

FOREIGN PATENT DOCUMENTS

| FR | 2 848 700 A1 | 6/2004 |
| WO | 2008/128989 A1 | 10/2008 |
| WO | 2016/133602 A1 | 8/2016 |

OTHER PUBLICATIONS

Extended European Search Report dated Jul. 30, 2018, issued in the European patent application No. 18162328.1.

*Primary Examiner* — Mihir K Rayan
(74) *Attorney, Agent, or Firm* — Jefferson IP Law, LLP

(57) ABSTRACT

An electronic device having one or more piezoelectric elements is provided. The electronic device includes a housing including at least one portion of a surface of the electronic device, a first piezoelectric element formed at a partial area of the housing and configured to output a signal of a designated frequency band, and a second piezoelectric element formed at another partial area of the housing and configured to receive a reflection signal in which the signal output from the first piezoelectric element is reflected by an external object that has contacted the at least one portion of the housing.

17 Claims, 18 Drawing Sheets

(56) References Cited

U.S. PATENT DOCUMENTS

| | | |
|---|---|---|
| 2014/0354596 A1 | 12/2014 | Djordjev et al. |
| 2015/0015515 A1 | 1/2015 | Dickinson et al. |
| 2015/0169136 A1 | 6/2015 | Ganti et al. |
| 2015/0198699 A1 | 7/2015 | Kuo et al. |
| 2015/0241393 A1* | 8/2015 | Ganti ............... G01N 29/09 73/589 |
| 2015/0242696 A1* | 8/2015 | Kim ............... G06F 3/0416 345/173 |
| 2016/0092715 A1* | 3/2016 | Yazdandoost ........ G06K 9/0002 382/124 |
| 2016/0246396 A1* | 8/2016 | Dickinson ............. G06F 3/0412 |
| 2017/0024597 A1* | 1/2017 | Cho ............... G06F 3/041 |
| 2017/0053151 A1* | 2/2017 | Yeke Yazandoost ................... A61B 5/6898 |

\* cited by examiner

ELECTRONIC DEVICE HAVING A PLURALITY OF PIEZOELECTRIC ELEMENTS

CROSS-REFERENCE TO RELATED APPLICATION(S)

This application claims the benefit under 35 U.S.C. § 119(a) of a Korean patent application filed on Mar. 16, 2017 in the Korean Intellectual Property Office and assigned Ser. No. 10-2017-0033264, the entire disclosure of which is hereby incorporated by reference.

TECHNICAL FIELD

The present disclosure relates to an electronic device having a plurality of piezoelectric elements.

BACKGROUND

Nowadays, with increases in the degree of integration of electronic devices and development of high technology, various functions have been mounted in the electronic devices. Further, electronic devices having a touchscreen as an input and output means for an interaction with a user are being widely used. The electronic device may have a fingerprint recognition sensor as a user authentication means for protection of personal information, Internet banking, and payments.

The fingerprint recognition sensor may be implemented with an optical method, a capacitive method, or an ultrasonic method. The fingerprint recognition sensor of an ultrasonic method may receive a signal in which sound waves generated through a piezoelectric element (e.g., oscillator) that generates sound waves are reflected by responding to a contact with a user body to generate data for fingerprint recognition. Because the fingerprint recognition sensor of an ultrasonic method can variously recognize biometric information other than a fingerprint such as a blood vessel within a finger, compared with the fingerprint recognition sensor of an optical method and a capacitive method, interest has increased in the fingerprint recognition technology field using an ultrasonic method. However, there is a structural problem that the fingerprint recognition sensor of an ultrasonic method should be mounted in an area other than a display area of a touch screen, i.e., a peripheral area of the display. Despite this problem, a user may request recognition of a touch and a fingerprint in a display area of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that can detect each of a touch and a fingerprint in a display area of an electronic device having a fingerprint recognition sensor of an ultrasonic method.

In accordance with an aspect of the present disclosure, an electronic device is provided. The electronic device includes a housing including at least one portion of a surface of the electronic device, a first piezoelectric element formed at a partial area of the housing and configured to output a signal of a designated frequency band, and a second piezoelectric element formed at another partial area of the housing and configured to receive a reflection signal in which the signal output from the first piezoelectric element is reflected by an external object that has contacted the at least one portion of the housing.

In accordance with another aspect of the present disclosure, an electronic device is provided. The electronic device includes a housing, a display including at least one portion received in the housing, a first piezoelectric element formed at a partial area of the housing and configured to output a signal of a designated frequency band, and a second piezoelectric element formed in at least a partial area of the display and configured to receive a reflection signal in which the signal is reflected by the external object that has contacted at least one portion of the display.

In accordance with another aspect of the present disclosure, an electronic device is provided. The electronic device includes a including a surface of the electronic device, a first piezoelectric element formed in at least a partial area of the housing, a second piezoelectric element formed in another partial area of the housing, and at least one processor configured to determine situation information related to the electronic device, designate a mode of the first piezoelectric element to a first operation mode and a mode of the second piezoelectric element to a second operation mode based on at least the situation information, and perform a designated function using the first piezoelectric element and the second piezoelectric element.

In accordance with another aspect of the present disclosure, an electronic device is provided. The electronic device includes a touchscreen, a plurality of ultrasonic sensors each disposed in at least a partial area or another area of the touchscreen, and at least one processor electrically connected to the touchscreen module, the plurality of ultrasonic sensors, and the memory, wherein the at least one processor is configured to select a first ultrasonic sensor, among the plurality of ultrasonic sensors, that operates in an ultrasonic generation mode for outputting a signal of a designated frequency band among the plurality of ultrasonic sensors, and select a second ultrasonic sensor, among the plurality of ultrasonic sensors, that operates in a receiving mode for receiving a signal of the designated frequency band based on at least one of operation information of the plurality of ultrasonic sensors and state information of the electronic device, and perform a designated function using the selected ultrasonic sensors.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 13A, 13B, and 13C are diagrams illustrating a pixel structure of a plurality of ultrasonic sensors according to various embodiments of the present disclosure;

Throughout the drawings, it should be noted that like reference numbers are used to depict the same or similar elements, features, and structures.

DETAILED DESCRIPTION

Figure 1:
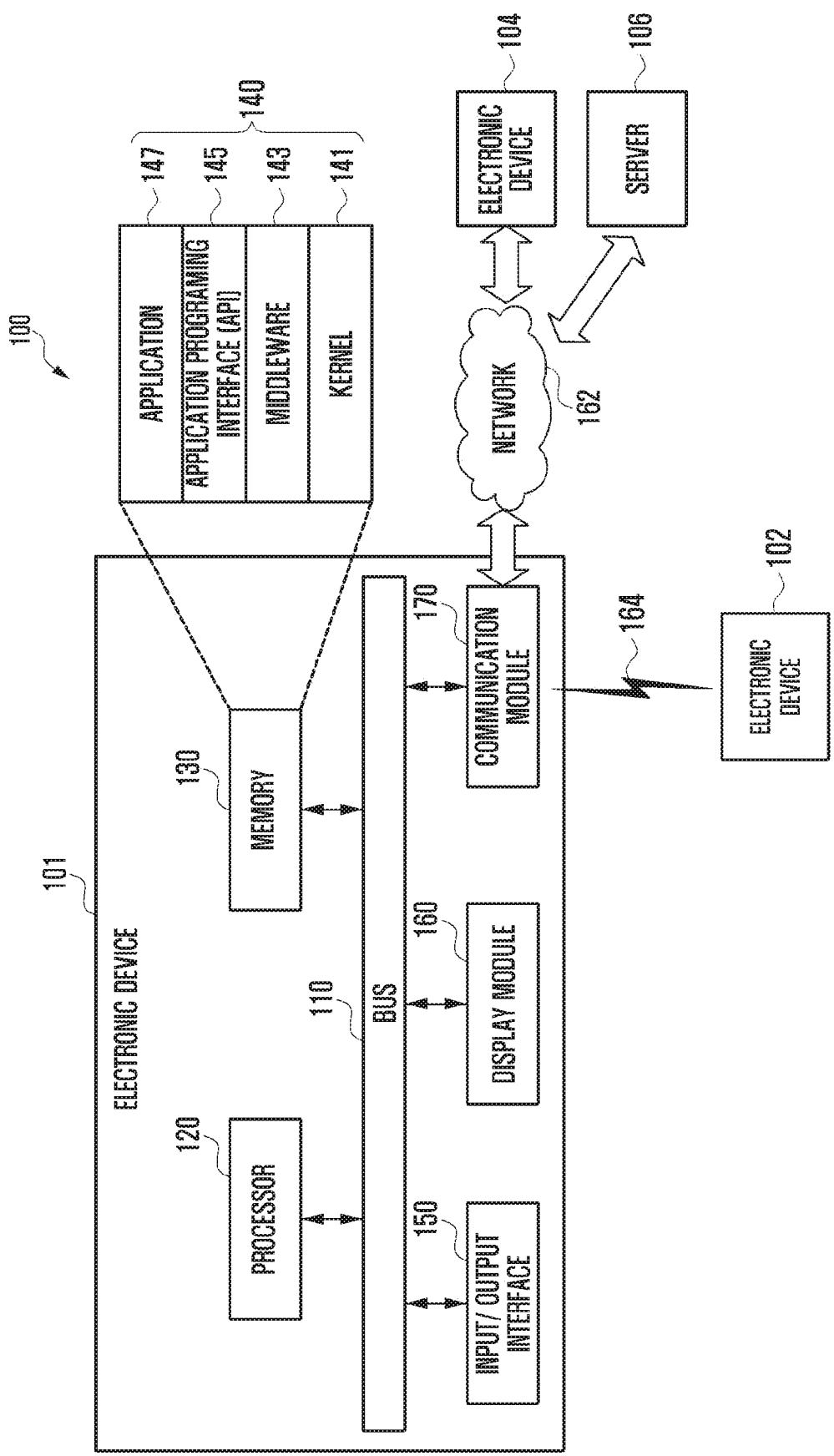
FIG. 1 is a block diagram illustrating a configuration of an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, the term "A or B" or "at least one of A and/or B" includes all possible combinations of words enumerated together. The terms "first" and "second" may describe various constituent elements, but they do not limit the corresponding constituent elements. For example, the above-described terms do not limit the order and/or importance of the corresponding constituent elements, but may be used to differentiate a constituent element from other constituent elements. When it is described that an (e.g., first) element is "connected" or "coupled" to another (e.g., second) element (e.g., functionally or communicatively), the element may be "directly connected" to the other element or "connected" to the other element through another (e.g., third) element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the various embodiments of the present disclosure.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram of a network environment 100 including an electronic device 101, according to an embodiment of the present disclosure. The electronic device 101 includes a bus 110, a processor 120, a memory 130, an input/output (I/O) interface 150, a display 160, and a communication interface 170.

The bus 110 may be a circuit connecting the above described components and transmitting communication (e.g., a control message) between the above described components. The processor 120 may receive commands from other components (e.g., the memory 130, the I/O interface 150, the display 160, the communication interface/module 170, or the communication control module) through the bus 110, analyze the received commands, and execute calculation or data processing according to the analyzed commands.

The memory 130 may store commands or data received from the processor 120 or other components (e.g., the I/O interface 150, the display 160, the communication interface/module 170, or generated by the processor 120 or other components. The memory 130 may include programming modules, for example, a kernel 141, middleware 143, an application programming interface (API) 145, or an application 147. Each of the aforementioned programming modules may be implemented by software, firmware, hardware, or a combination of two or more thereof.

The kernel 141 may control or manage system resources (e.g., the bus 110, processor 120, memory 130, etc.) used to execute operations or functions of the programming modules, e.g., the middleware 143, API 145, and application 147. The kernel 141 may also provide an interface that may access and control/manage the components of the electronic device 101 via the middleware 143, API 145, and application 147.

The middleware 143 may make it possible for the API 145 or application 147 to perform data communication with the kernel 141. The middleware 143 may also perform control operations (e.g., scheduling, load balancing) for task requests transmitted from the application 147 by methods, e.g., a method for assigning the order of priority to use the system resources (e.g., the bus 110, processor 120, memory 130, etc.) of the electronic device 101 to at least one of the applications 147.

The API 145 is the interface for the applications 147 to control the function provided by the kernel 141 or the middleware 143 and may include at least one interface or function (e.g. command) for file control, window control, image control, or text control.

The I/O interface 150 may receive a command or data as input from a user via in-output apparatus (e.g., sensor, keyboard, or touchscreen, or the like) and may deliver the received command or data to the processor 120 or the memory 130 through the bus 110. The I/O interface 150 may display a video, an image, data, or the like to the user.

The display 160 may be a liquid crystal display (LCD) and an active matrix organic light emitting diode (AM-OLED) display, microelectromechanical systems (MEMS), electronic paper display and the like. The display 160 may include the touch panel and one module. The display 160 may display the received various information (e.g., multimedia data, text data) from the above-described elements.

The communication interface 170 may connect communication between the electronic device 101 and an electronic device 104 or server 106. For example, the communication interface 170 may access a network 162 through wireless or wired communication to communicate with the external device. Additionally, the communication interface 170 may establish a short-range wireless communication 164 between the electronic device 101 and any other electronic device (e.g., electronic device 102). The wireless communication may include at least one of WiFi, Bluetooth (BT), near field communication (NFC), a global positioning system (GPS), and cellular communication (e.g., long-term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), recommended standard 232 (RS-232), and a plain old telephone service (POTS).

The wireless communication may include global navigation satellite system (GNSS). The GNSS may include at least one of, for example, a GPS, a global navigation satellite system (Glonass), a navigation satellite system (Beidou), and a European global satellite-based navigation system (Galileo), according to a use area, a bandwidth, or the like.

Figure 2:
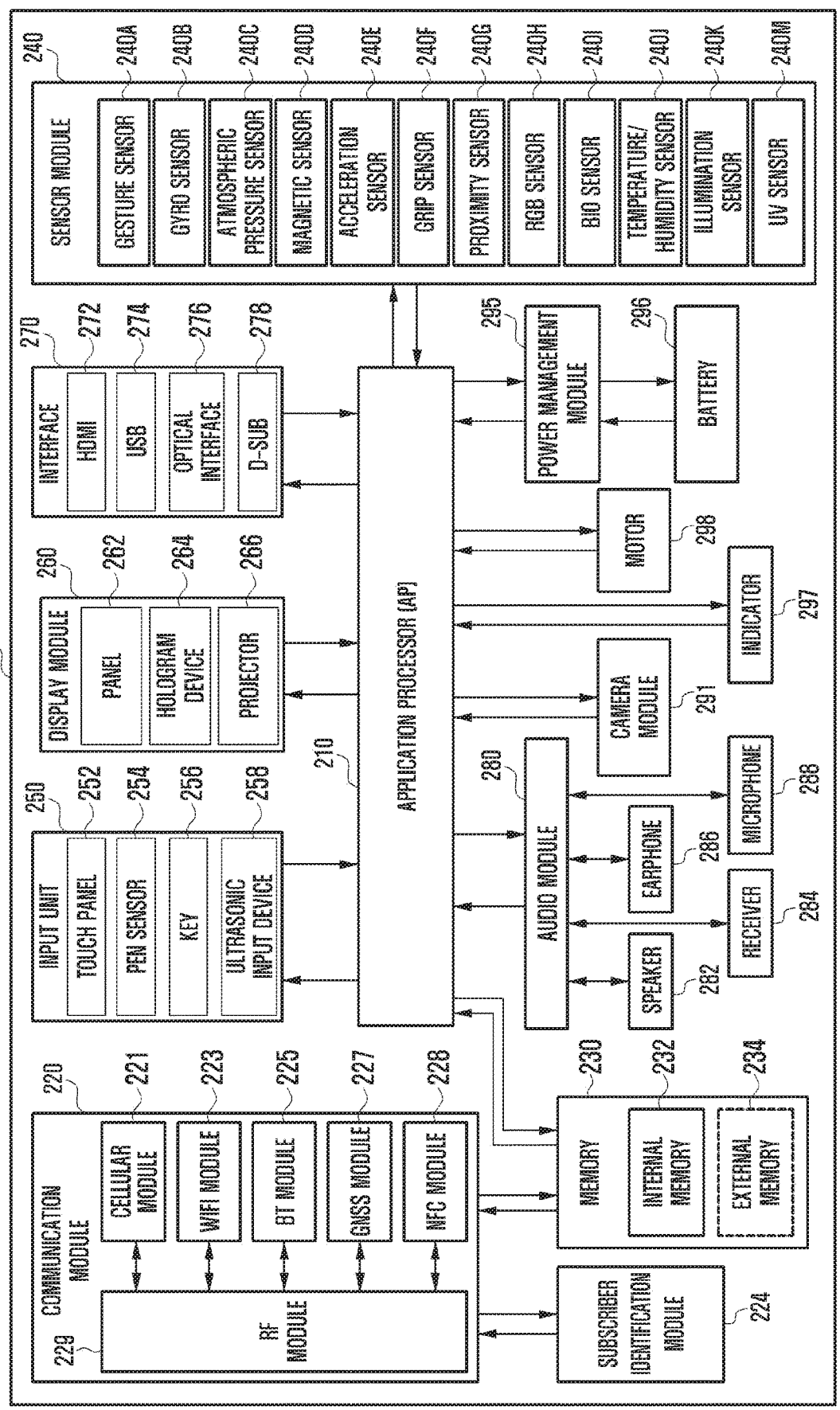
FIG. 2 is a block diagram illustrating a configuration of an electronic device according to various embodiments of the present disclosure.

FIG. 2 is a block diagram of an electronic device 201, according to an embodiment of the present disclosure. The electronic device 201 may include some or all of the parts of the electronic device 101 illustrated in FIG. 1. The electronic device 201 may include one or more application processors (APs) 210, a communication module 220, a subscriber identification module (SIM) 224, a memory 230, a sensor module 240, an input device 250, a display 260, an interface 270, an audio module 280, a camera module 291, a power managing module 295, a battery 296, an indicator 297, and a motor 298.

The AP 210 operates an operation system or an application program so as to control a plurality of hardware or software component elements connected to the AP 210 and execute various data processing and calculations including multimedia data. The AP 210 may be implemented by a system on chip (SoC). The processor 210 may further include a graphics processing unit (GPU).

The communication module 220 may transmit/receive data in communication between different electronic devices (e.g., the electronic device 104 and the server 106 connected to the electronic device 201 through a network. The communication module 220 may include a cellular module 221, a WiFi module 223, a BT module 225, a GPS module (e.g., a GNSS module 227), an NFC module 228, and a radio frequency (RF) module 229.

The cellular module 221 may provide a voice call, a video call, a short message service (SMS), or an internet service through a communication network (e.g., LTE, LTE-A, CDMA, WCDMA, UMTS, WiBro, GSM or the like). Further, the cellular module 221 may distinguish and authenticate electronic devices within a communication network by using the SIM 224. The cellular module 221 may perform at least some of the functions which can be provided by the AP 210 and may perform at least some of the multimedia control functions.

The cellular module 221 may include a communication processor (CP), and may be implemented by an SoC.

Figure 8:
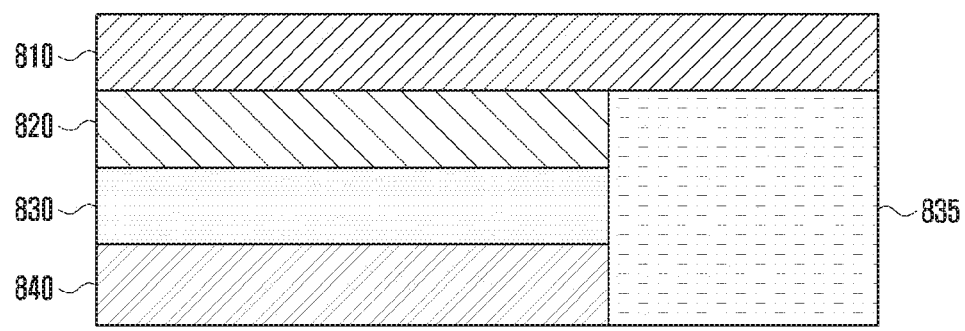

Although the components such as the cellular module 221 (e.g., a CP), the memory 230, and the power managing module 295 are illustrated as components separated from the AP 210 in FIG. 8, the AP 210 may include at least some (e.g., cellular module 221) of the aforementioned components in one embodiment.

The AP 210 or the cellular module 221 may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include a process for processing data transmitted/received through the corresponding module. Although the cellular module 221, the WiFi module 223, the BT module 225, the GPS module 227, and the NFC module 228 are illustrated as blocks separated from each other in FIG. 2, at least some (e.g., two or more) of the cellular module 221, the WiFi module 223, the BT module 225, the GPS module 227, and the NFC module 228 may be included in one integrated chip (IC) or one IC package. For example, at least some (e.g., the CP corresponding to the cellular module 221 and the WiFi processor corresponding to the WiFi module 223) of the processors corresponding to the cellular module 221, the WiFi module 223, the BT module 225, the GPS module 221, and the NFC module 223 may be implemented by one SoC.

The RF module 229 may transmit/receive data, e.g., an RF signal. Although not illustrated, the RF module 229 may include a transceiver, a power amplifier module (PAM), a frequency filter, a low noise amplifier (LNA) or the like. Further, the RF module 229 may further include a component for transmitting/receiving electronic waves over a free air space in wireless communication, e.g., a conductor, a conducting wire or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module.

The SIM 224 may be inserted into a slot formed in a particular portion of the electronic device 201. The SIM 224 may include unique identification information (e.g., integrated circuit card identifier (ICCID)) or subscriber information (e.g., international mobile subscriber identity (IMSI)).

The memory 230 may include an internal memory 232 or an external memory 234. The internal memory 232 may include at least one of a volatile memory (e.g., a dynamic random access memory (DRAM), a static RAM (SRAM), a synchronous dynamic RAM (SDRAM), and the like), and a non-volatile Memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

The internal memory 232 may be a solid state drive (SSD). The external memory 234 may further include a flash drive, for example, a compact flash (CF), a secure digital (SD), a micro-SD, a mini-SD, an extreme digital (xD), or a memory stick. The external memory 234 may be functionally connected to the electronic device 201 through various interfaces. The electronic device 201 may further include a storage device (or storage medium) such as a hard drive.

The sensor module 240 may measure a physical quantity or detect an operation state of the electronic device 201, and convert the measured or detected information to an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination sensor 240K, and an ultra violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling one or more sensors included in the sensor module 240.

The input device 250 may include a touch panel 252, a (digital) pen sensor 254, a key 256, or an ultrasonic input device 258. The touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 may provide a tactile reaction to the user.

The (digital) pen sensor 254 may be implemented using a method identical or similar to a method of receiving a touch input of the user, or using a separate recognition sheet. The key 256 may include a physical button, an optical key, or a key pad. The ultrasonic input device 258 is a device which can detect an acoustic wave by a microphone 288 of the electronic device 201 through an input means generating an ultrasonic signal to identify data and can perform wireless recognition. The electronic device 201 may receive a user input from an external device (e.g., computer or server) connected to the electronic device 201 by using the communication module 220.

The display 260 may include a panel 262, a hologram device 264, or a projector 266. The panel 262 may be an LCD or an AM-OLED. The panel 262 may be flexible, transparent, or wearable. The panel 262 may be configured by the touch panel 252 and one other module. The hologram device 264 may show a stereoscopic image in the air by using interference of light. The projector 266 may project light on a screen to display an image. The screen may be located inside or outside the electronic device 201. The display 260 may further include a control circuit for controlling the panel 262, the hologram device 264, or the projector 266. The interface 270 may include an HDMI 272, a USB 274, an optical interface 276, or a d-subminiature (D-sub) 278. The interface 270 may be included in the communication interface (e.g., communication module/interface 170) illustrated in FIG. 1. Additionally or alternatively, the interface 270 may include a mobile high-definition link (MHL) interface, a secure digital (SD) card/multimedia card (MMC), or an IR data association (IrDA) standard interface.

The audio module 280 may bi-directionally convert a sound and an electronic signal. At least some components of the audio module 280 may be included in the input/output (I/O) interface 140 illustrated in FIG. 1. The audio module 280 may process sound information input or output through, for example, a speaker 282, a receiver 284, an earphone 286, the microphone 288 or the like.

The camera module 291 is a device which can photograph a still image and a video. The camera module 291 may include one or more image sensors (e.g., a front sensor or a back sensor), an image signal processor (ISP) or a flash (e.g., an LED or xenon lamp).

The power managing module 295 may manage power of the electronic device 201. Although not illustrated, the power managing module 295 may include a power management integrated circuit (PMIC), a charger integrated circuit (IC), or a battery gauge.

The PMIC may be mounted to an integrated circuit or an SoC. A charging method may include wired and wireless methods. The charger IC may charge a battery and prevent over voltage or over current from being flowed from a charger. The charger IC may include a charger IC for at least one of the wired charging method and the wireless charging method. The wireless charging method may include a magnetic resonance method, a magnetic induction method and an electromagnetic wave method, and additional circuits for wireless charging, e.g., circuits such as a coil loop, a resonant circuit, a rectifier or the like may be added.

The battery gauge may measure a remaining quantity of the battery 296, or a voltage, a current, or a temperature during the charging. The battery 296 may store or generate electricity and supply power to the electronic device 201 by using the stored or generated electricity. The battery 296 may include a rechargeable battery or a solar battery.

The indicator 297 may show particular statuses of the electronic device 201 or a part (e.g., AP 210) of the hardware, e.g., a booting status, a message status, a charging status and the like. The motor 298 may convert an electrical signal to a mechanical vibration.

Although not illustrated, the electronic device 201 may include a processing unit (e.g., GPU) for supporting a module TV. The processing unit for supporting the mobile TV may process media data according to a standard of digital multimedia broadcasting (DMB), digital video broadcasting (DVB), media flow or the like.

Each of the components of the electronic device 201 may be implemented by one or more components and the name of the corresponding component may vary depending on a type of the electronic device. The electronic device 201 may include at least one of the above described components, a few of the components may be omitted, or an additional component may be further included. Also, some of the components of the electronic device 201 may be combined to form a single entity, and thus may equivalently execute functions of the corresponding components before being combined.

Figure 3:
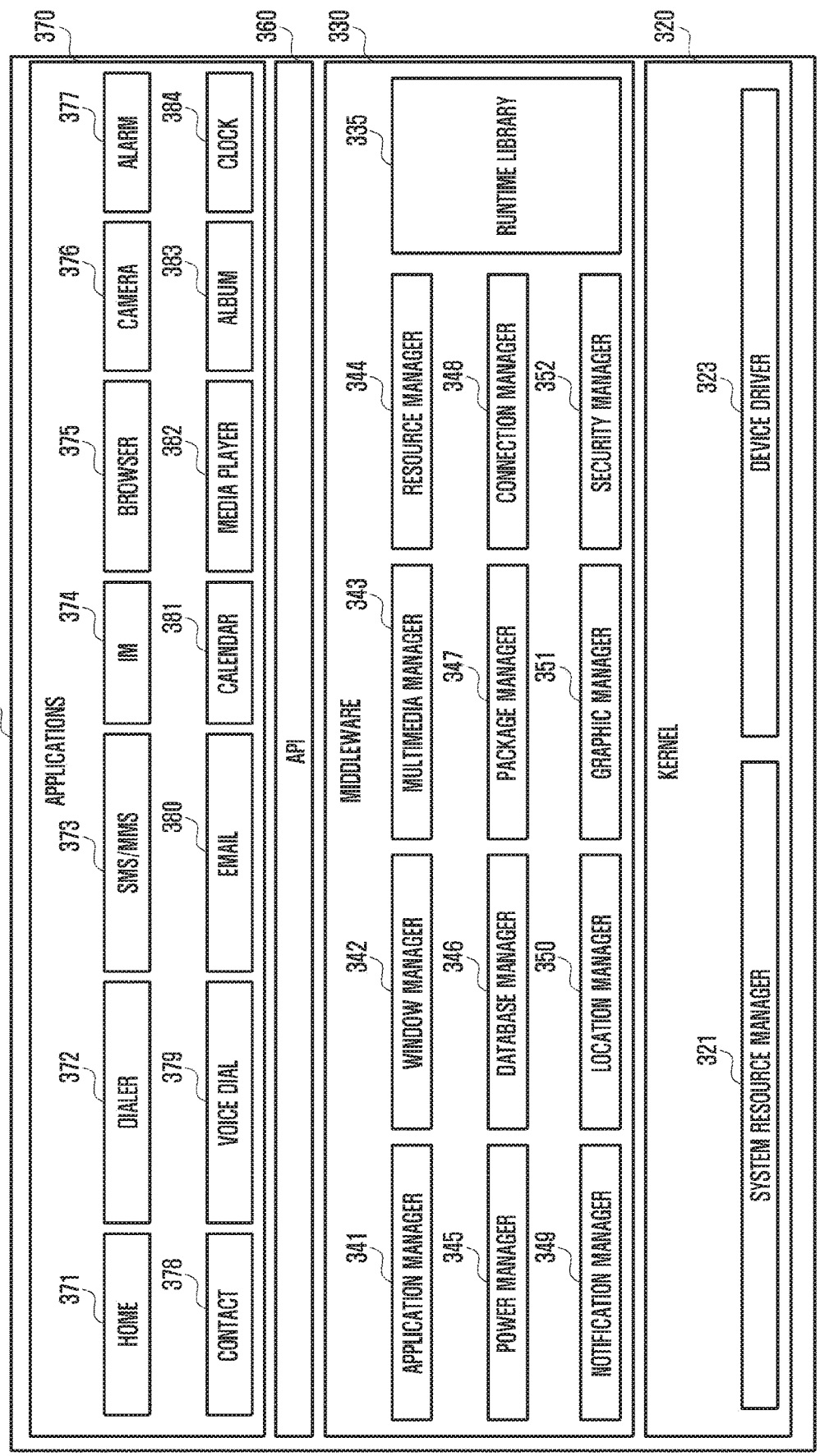
FIG. 3 is a block diagram illustrating a configuration of a program module according to various embodiments of the present disclosure.

FIG. 3 is a block diagram of a programming module 310, according to an embodiment of the present disclosure. The programming module 310 may be included (stored) in the electronic device 101 (e.g., memory 130) illustrated in FIG. 1. At least some of the programming module 310 may be formed of software, firmware, hardware, or a combination of at least two of software, firmware, and hardware. The programming module 310 may be executed in the hardware (e.g., electronic device 201) to include an operating system (OS) controlling resources related to the electronic device 101 or various applications driving on the OS. For example, the OS may be Android™, iOS™ Windows™, Symbian™, Tizen™, Bada™ or the like. Referring to FIG. 3, the programming module 310 may include a kernel 320, a middleware 330, an API 360, or an application 370.

The kernel 320 may include a system resource manager 321 or a device driver 323. The system resource manager 321 may include a process manager, a memory manager, or a file system manager. The system resource manager may perform a system resource control, allocation, or recall. The device driver 323 may include a display driver, a camera driver, a BT driver, a shared memory driver, a USB driver, a keypad driver, a WiFi driver, or an audio driver. Further, the device driver 323 may include an inter-process communication (IPC) driver.

The middleware 330 may include a plurality of modules to provide a function required in common by the applications 370. Further, the middleware 330 may provide a function through the API 360 to allow the application 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a complier to add a new function through a programming language while the application 370 is executed. The runtime library 335 may execute input and output, management of a memory, a function associated with an arithmetic function or the like.

The application manager 341 may manage a life cycle of at least one of the applications 370. The window manager 342 may manage graphical user interface (GUI) resources used on the screen. The multimedia manager 343 may detect a format required for reproducing various media files and perform an encoding or a decoding of a media file by using a codec suitable for the corresponding format. The resource manager 344 may manage resources such as a source code, a memory, or a storage space of at least one of the applications 370.

The power manager 345 may operate together with a basic input/output system (BIOS) to manage a battery or power and provide power information required for the operation. The database manager 346 may manage generation, search, or change of a database to be used by at least one of the applications 370. The package manager 347 may manage an installation or an update of an application distributed in a form of a package file.

The connectivity manager 348 may manage a wireless connection such as WiFi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 may provide a general security function required for a system security or a user authentication. When the electronic device 101 has a call function, the middleware 330 may further include a telephony manager for managing a voice of the electronic device or a video call function.

The middleware 330 may generate a new middleware module through a combination of various functions of the aforementioned internal component modules and use the generated new middleware module. The middleware 330 may provide a module specified for each type of operating system (OS) to provide a differentiated function. Further, the middleware 330 may dynamically delete some of the components of the related art or add new components. Accordingly, some of the components may be omitted, replaced with other components having different names but performing similar functions, or other components may be further included.

The API 360 is a set of API programming functions, and may be provided with a different configuration according to an OS. For example, in Android™ or iOS™ a single API set may be provided for each platform. In Tizen™, two or more API sets may be provided.

The applications 370 may include a preloaded application or a third party application.

At least some of the programming module 310 may be implemented by a command stored in a computer-readable storage medium. When the command is executed by one or more processors 210, the one or more processors may perform a function corresponding to the command. The computer-readable storage medium may be, for example, the memory 260. At least some of the programming module 310 may be implemented or executed by, for example, the processor 210. At least some of the programming module 310 may include, for example, a module, a program, a routine, sets of instructions, or a process for performing one or more functions.

Names of components of the programming module 310 may vary depending on a type of operating system (OS). Further, the programming module may include one or more of the aforementioned components, omit some of the components, or further include other additional components.

The applications 370 may include one or more applications that can perform functions, such as home application 371, dialer application 372, SMS/multimedia messaging service (MMS) application 373, instant message application (IM) 374, browser application 375, camera application 376, alarm application 377, contacts application 378, voice dial application 379, e-mail application 380, calendar application 381, media player application 382, album application 383, clock application 384, health care (e.g., measure exercise quantity or blood sugar level), or environment information (e.g., atmospheric pressure, humidity, temperature information or the like).

Hereinafter, an illustration of a configuration of an electronic device having a plurality of ultrasonic sensors will be described.

Figure 4:
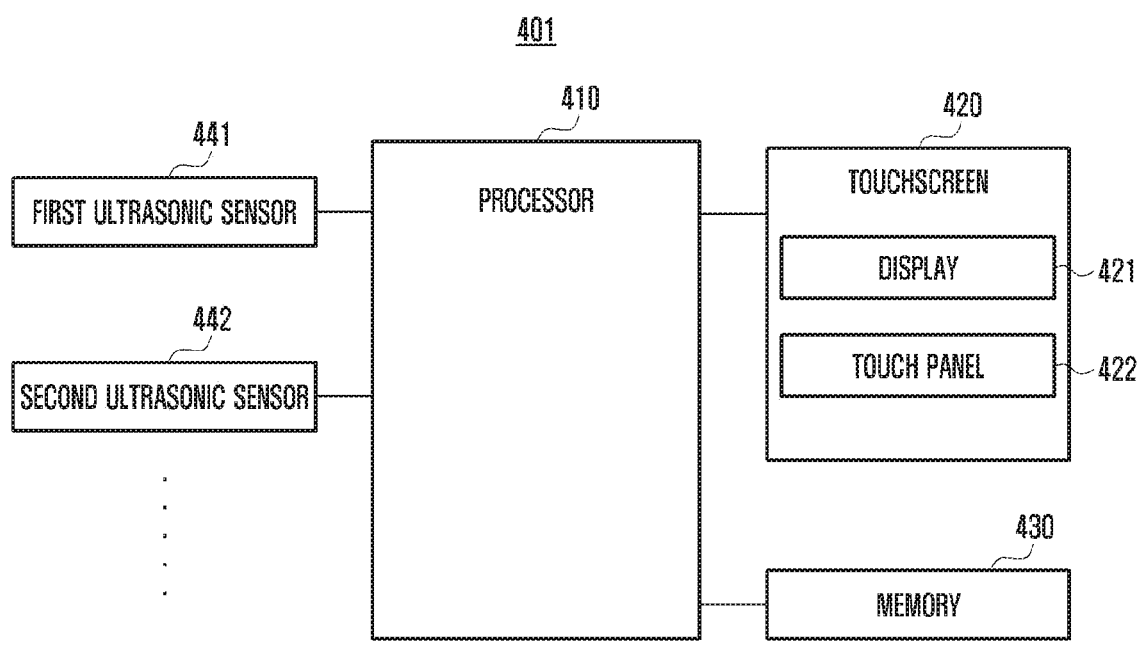
FIG. 4 is a block diagram illustrating a configuration of an electronic device having a plurality of ultrasonic sensors according to various embodiments of the present disclosure.

FIG. 4 is a block diagram illustrating a configuration of an electronic device having a plurality of ultrasonic sensors according to various embodiments of the present disclosure.

Referring to FIG. 4, an electronic device 401 (e.g., the electronic device 101 or 201) according to various embodiments of the present disclosure may include a plurality of ultrasonic sensors, a touchscreen 420, a memory 430 (e.g., the memory 130 or 230), and a processor 410 (e.g., the processor 120 or 210). The electronic device 401 according to various embodiments may have two ultrasonic sensors, but it may have two or more ultrasonic sensors. The electronic device 401 may include an entire configuration or a partial configuration of the electronic device 101 or 201 of FIG. 1 or 2.

The touchscreen 420 may include a display 421 (e.g., the display 160 or 260) and a touch panel 422 (e.g., the touch panel 252) for an interaction between the electronic device and a user. The touchscreen 420 may be electrically connected to the processor 410, display various information through the display 421, and respond to a contact of an object (e.g., a finger) at an upper surface of the touch panel 422 to generate and output a touch signal. The display 421 may display various information (e.g., text, image, video, icon, or symbol) to the user under the control of the processor 410. Alternatively, the display 421 may display a screen of a user interface (UI) related to an operation state of a touchscreen module or the electronic device and an operation thereof. The display 421 may be formed with, for example, any one of a liquid crystal display (LCD), light-emitting diode (LED) display, organic light-emitting diode (OLED) display, or microelectromechanical systems (MEMS) display, and electronic paper display.

The touch panel 422 may recognize a touch point based on a user's touch input signal (e.g., touch or proximity) and measure a location value of the touch input. The touch panel 422 may be implemented into an add-on type located on the display 421 or an on-cell type or an in-cell type inserted into the display 421. The touch panel 422 may use a resistive type, capacitive type, electromagnetic induction type, and optical method.

Ultrasonic sensors 441 and 442 may be integrally formed in an in-cell structure within a module of the touchscreen 420 or may be formed separately from a module of the touch screen 420.

According to various embodiments, the ultrasonic sensors 441 and 442 may be mounted in various structures at a location of the electronic device that uses the entire or a portion of a window that protects a module of the touchscreen 420 as an area for detecting a fingerprint. The window may be cover glass attached to a front surface of the touchscreen 420.

According to an embodiment, a fingerprint detection area may be an area of the window in which the ultrasonic sensors 441 and 442 are disposed at a lower portion and may be changed according to a location in which the ultrasonic sensors 441 and 442 are disposed. A detailed illustration of a mounting location of the ultrasonic sensors 441 and 442 will be described with reference to FIGS. 5 to 8, 9A, 9B, 10A, and 10B.

According to an embodiment, each of the ultrasonic sensors 441 and 442 may include at least one piezoelectric element including a piezoelectric material, for example, at least one material of zirconate titanate ceramics (PZT), lead scandium tantalate (PST), Quartz, (Pb, Sm)TiO$_3$, PMN(Pb (MgNb)O$_3$)—PT(PbTiO$_3$), polyvinylidene fluoride (PVDF), and PVDF-TrFe. The piezoelectric material may be a material in which a potential difference (voltage) occurs when a pressure is applied to a material or a material in which a vibration occurs by a physical displacement when a potential difference (voltage) occurs in a material.

According to an embodiment, the ultrasonic sensors 441 and 442 may perform at least one function of a generation mode that outputs ultrasonic waves and a receiving mode that receives ultrasonic waves. An ultrasonic sensor in an ultrasonic generation mode may generate ultrasonic waves (or sound). For example, when a voltage is applied under the control of the processor 410 to the ultrasonic sensor in an ultrasonic generation mode, a material constituting a piezoelectric element increases or reduces to generate a vibration, and constituent elements of a touchscreen window or a display generate a vibration by the generated vibration; thus, ultrasonic waves (or sound) may be generated.

An ultrasonic sensor in a receiving mode may receive ultrasonic waves (or sound). When ultrasonic waves are applied to a piezoelectric element, the piezoelectric element vibrates and a potential difference (voltage) occurs by a vibration of the piezoelectric element; thus, the ultrasonic sensors 441 and 442 may receive an ultrasonic signal.

According to an embodiment, ultrasonic waves generated by any one ultrasonic sensor operating in an ultrasonic generation mode among the ultrasonic sensors 441 and 442 may be transferred to an external object (e.g., a user hand or finger) that has contacted an upper surface of the electronic device, and the ultrasonic waves transferred to the external object may be reflected by the external object to be transferred to another one ultrasonic sensor operating in a receiving mode. The ultrasonic sensor operating in a receiving mode may receive ultrasonic waves reflected by the external object and convert the ultrasonic waves to an electric signal and transfer biometric information (e.g., fingerprint data or acoustic fingerprint image) corresponding to the external object to the processor 410.

According to an embodiment, the ultrasonic sensors 441 and 442 may operate in a receiver/speaker mode that outputs a sound signal of an audible frequency band other than an ultrasonic wave band. For example, the ultrasonic sensors 441 and 442 operating in a receiver/speaker mode may apply an electric signal corresponding to a sound signal to induce vibration occurrence of a piezoelectric element and output a sound of an audible frequency band according to vibration occurrence. According to an embodiment, a biometric information recognition area of the ultrasonic sensors 441 and 442 and a touch detection area or a fingerprint recognition area of the touch panel 422 may be shared. The electronic device 401 may control to simultaneously activate the touch panel 422 and the ultrasonic sensor and receive a user touch signal through a shared area and an ultrasonic signal reflected by ultrasonic generation. For example, the processor 410 may control to simultaneously or selectively activate the ultrasonic sensors 441 and 442 and the touch panel 422.

The processor 410 may be electrically connected to a plurality of ultrasonic sensors 441 and 442, the touchscreen 420, and the memory 430 and process data for selectively driving the plurality of ultrasonic sensors 441 and 442 as an ultrasonic receiver or an ultrasonic generator. The processor 410 may analyze biometric information (e.g., fingerprint information) based on a signal transferred from the plurality of ultrasonic sensors 441 and 442 to control an operation of an application or a function of the electronic device.

According to an embodiment, the processor 410 may control a portion of the ultrasonic sensors 441 and 442 to selectively operate in a receiving mode or a generation mode based on situation information of the electronic device. According to another embodiment, a portion of the ultrasonic sensors 441 and 442 may be located at an upper end portion of the display to be used in a receiver and/or speaker mode.

According to an embodiment, the processor 410 may determine situation information related to the electronic device and control to selectively change an operation mode of each of the ultrasonic sensors 441 and 442 based on occurrence of a predetermined specific condition or situation information. For example, when the first ultrasonic sensor 441 operates in a receiving mode, the processor 410 may control the second ultrasonic sensor 442 to operate in a generation mode. In contrast, when the first ultrasonic sensor 441 operates in a generation mode, the processor 410 may control the second ultrasonic sensor 442 to operate in a receiving mode.

The memory 430 may be a well-known volatile memory and non-volatile memory and is not limited to a detailed implementation example. The memory 430 may be disposed within a housing to be electrically connected to the processor 410. The memory 430 may include at least a portion of a configuration and/or a function of the memory 130 of FIG. 1 and/or the memory 230 of FIG. 2.

The memory 430 may store user biometric information (e.g., fingerprint information) for user authentication. The processor 410 may compare biometric information obtained through the ultrasonic sensor with user biometric information stored at the memory 430 to determine whether the user is a user having authority.

FIGS. 5 to 8 are cross-sectional views illustrating a touchscreen module in which a plurality of ultrasonic sensors are mounted at different locations in an electronic device according to various embodiments of the present disclosure.

The electronic device (e.g., the electronic device 401) according to various embodiments may include two ultrasonic sensors, but the present disclosure is not limited thereto and the electronic device may include two or more ultrasonic sensors. In the electronic device 401 according to various embodiments, two ultrasonic sensors may operate in at least one operation mode of a receiving mode that receives ultrasonic waves and a generation mode that generates ultrasonic waves. In the electronic device 401 according to various embodiments, an area corresponding to a disposition location of an ultrasonic sensor operating in a receiving mode may be a biometric information recognition area, and the electronic device 401 may control to output information that indicates biometric information recognition to a partial area of the display. Hereinafter, FIGS. 5 to 8 illustrate a structure in which two ultrasonic sensors are disposed, but the present disclosure is not limited thereto.

Figure 5:
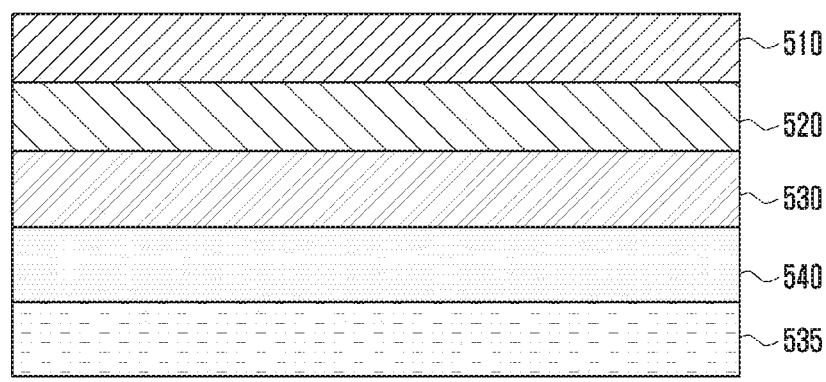
FIGS. 5, 6, 7, and 8 are cross-sectional views illustrating a touchscreen module in which a plurality of ultrasonic sensors are mounted at different locations in an electronic device according to various embodiments of the present disclosure.

Referring to FIG. 5, the electronic device 401 according to an embodiment may have, for example, a structure in which a window 510, touch panel 520, first ultrasonic sensor 530, display 540, and second ultrasonic sensor 535 are sequentially layered.

The window 510 may be located at an upper surface of the touch panel 520 and be located at an uppermost portion among the constituent elements of the touchscreen module. An upper surface of the window 510 may be exposed at a front surface of the electronic device (e.g., the electronic device 401) and may be a contact area of an object (e.g., hand, finger). The touch panel 520 may be located at a lower surface of the window 510. The touch panel 520 may detect a touch signal (e.g., touch or proximity) of an object that has contacted the window 510.

According to an embodiment of FIG. 5, the first ultrasonic sensor 530 may be located at a lower surface of the touch panel 520 and be located at an upper surface of the display 540. The second ultrasonic sensor 535 may be located at a lower surface of the display 540. The first ultrasonic sensor 530 and the second ultrasonic sensor 535 may operate in at least one mode of a receiving mode and a generation mode. For example, the ultrasonic sensor may be configured to generate ultrasonic waves corresponding to a wavelength range of approximately 1 MHz to 10 MHz or may be configured to receive a reflected ultrasonic signal of generated ultrasonic waves by responding to a contact of a user body.

Further, according to various embodiments of the present disclosure, some of a plurality of ultrasonic sensors may be used as a fingerprint sensor. For example, when ultrasonic waves generated in an ultrasonic sensor in a generation mode are transferred to a user body (e.g., finger bottom), a portion of the ultrasonic waves contact a valley and a crest of a fingerprint and another portion thereof contact air. The ultrasonic sensor in a receiving mode receives ultrasonic waves reflected by the valley and the crest of the fingerprint of the finger, converts the reflected ultrasonic signals to a digital value representing signal strength, and converts the converted digital value to an image, thereby generating the user's biometric information (e.g., fingerprint image).

The display 540 may display a predetermined image (e.g., fingerprint-shaped image or button image) such that the user recognizes a biometric information recognition area. An upper surface corresponding to a disposition location of the first ultrasonic sensor 530 and the second ultrasonic sensor 535 may be a biometric information recognition area (or fingerprint detection area). In an embodiment of FIG. 5, the biometric information recognition area may be an entire area of the display 540 and the touch panel 520. That is, an entire touch detection area of the touch panel 520 may be overlapped with the biometric information recognition area.

Figure 6:
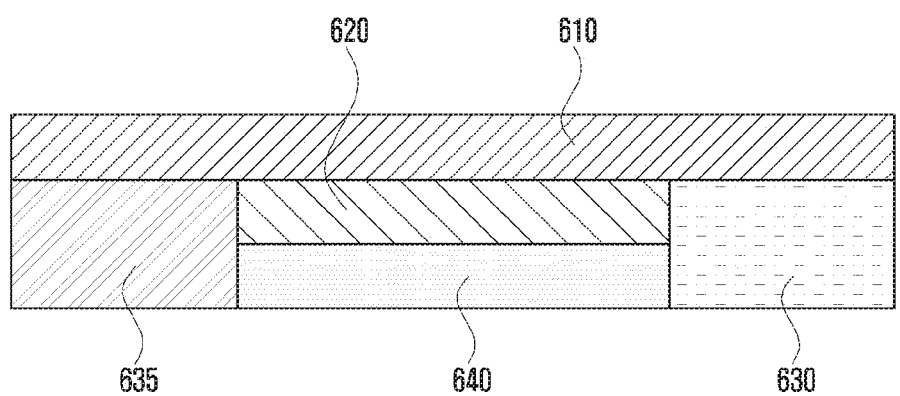
Figure 7:
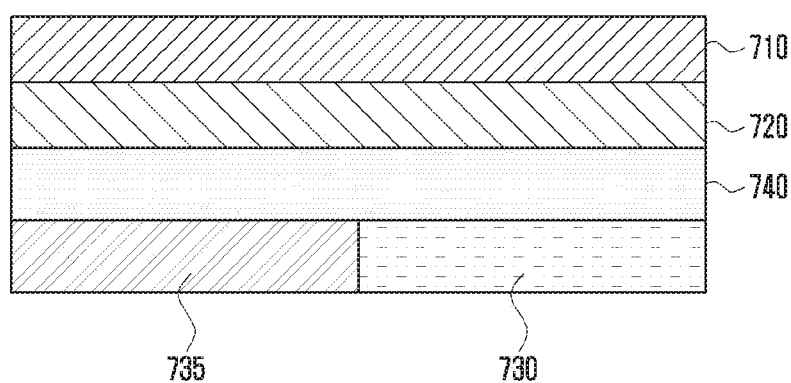

Referring to FIG. 6, in the electronic device 401 according to another embodiment, a window 610 may be located at an uppermost portion of a touch panel 620, first ultrasonic sensor 630, and second ultrasonic sensor 635. In this case, the window 610 may have a size relatively larger than a display size of the touch panel 620 and a display 640. The window 610 may be divided into a touch detection area, a disposition area of the first ultrasonic sensor 630, and a disposition area of the second ultrasonic sensor 635. For example, when the first ultrasonic sensor 630 operates in a generation mode and when the second ultrasonic sensor 635 operates in a receiving mode, a disposition area of the second ultrasonic sensor 635 may be a biometric information recognition area. In this case, the display 640 may display a predetermined image (e.g., a fingerprint-shaped image or a button image) that indicates a biometric information recognition area in an area corresponding to a disposition location of the second ultrasonic sensor 635.

The first ultrasonic sensor 630 may transfer a vibration to the window 610 located at an upper end portion to generate ultrasonic waves. Accordingly, ultrasonic waves may be transferred to an external object that has contacted the biometric information recognition area, and ultrasonic waves reflected by the external object may be received in the second ultrasonic sensor 635 disposed at a lower portion of the biometric information recognition area. The second ultrasonic sensor 635 may convert an ultrasonic signal reflected and transferred from the external object to a digital value representing signal strength and convert the converted digital value to an image to obtain biometric information corresponding to the object that has contacted the biometric information recognition area.

In the electronic device 401 according to another embodiment, at a lower surface of a display area, two ultrasonic sensors may be disposed. For example, referring to FIG. 7, in the electronic device 401, a window 710, touch panel 720, and display 740 may be sequentially disposed, and at a lower portion of a first area of the display 740, a first ultrasonic sensor 730 may be disposed, and at a lower portion of a second area of the display 740, a second ultrasonic sensor 735 may be disposed. In an embodiment of FIG. 7, the window 710 may be located at an upper surface of the touch panel 720, and the window 710 may have substantially the same area as that of the touch panel 720 and the display 740.

According to an embodiment, the first ultrasonic sensor 730 may operate in a receiving mode that receives ultrasonic waves, and the second ultrasonic sensor 735 may operate in a generation mode that generates ultrasonic waves and vice versa. In the electronic device 401, when the first ultrasonic sensor 730 is in a receiving mode, an area corresponding to a disposition location of the first ultrasonic sensor 730 may be a biometric information recognition area. Alternatively, when the second ultrasonic sensor 735 is in a receiving mode, a disposition area of the second ultrasonic sensor 735 may be a biometric information recognition area.

When one of the first ultrasonic sensor 730 and the second ultrasonic sensor 735 is in a receiving mode, the electronic device 401 according to an embodiment of the present disclosure may control to display a predetermined image (e.g., a fingerprint-shaped image or a button image) that indicates a biometric information recognition area in a display area corresponding to a disposition location of the ultrasonic sensor in a receiving mode.

The electronic device 401 may obtain biometric information (e.g., fingerprint information) through any one ultrasonic sensor operating in a receiving mode among the first ultrasonic sensor 730 and the second ultrasonic sensor 735 and perform user authentication based on the obtained biometric information.

Referring to FIG. 8, in the electronic device 401 according to various embodiments, two ultrasonic sensors may be disposed in different sizes. In an embodiment of FIG. 8, a first ultrasonic sensor 830 is disposed between a touch panel 820 and a display 840, but the present disclosure is not limited thereto and the first ultrasonic sensor 830 may be disposed between a window 810 and the touch panel 820 or may be disposed at a lower surface of the display 840. In this case, a second ultrasonic sensor 835 may be disposed at an area that is not overlapped with a disposition area of the window 810, the touch panel 820, the second ultrasonic sensor 830, and the display 840, for example, at a peripheral area.

Figure 9A:
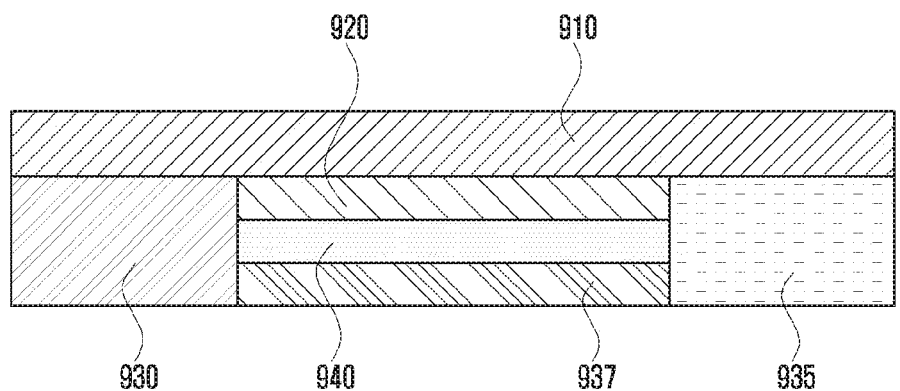
FIGS. 9A and 9B are diagrams illustrating an electronic device having a plurality of ultrasonic sensors according to various embodiments of the present disclosure.
Figure 9B:
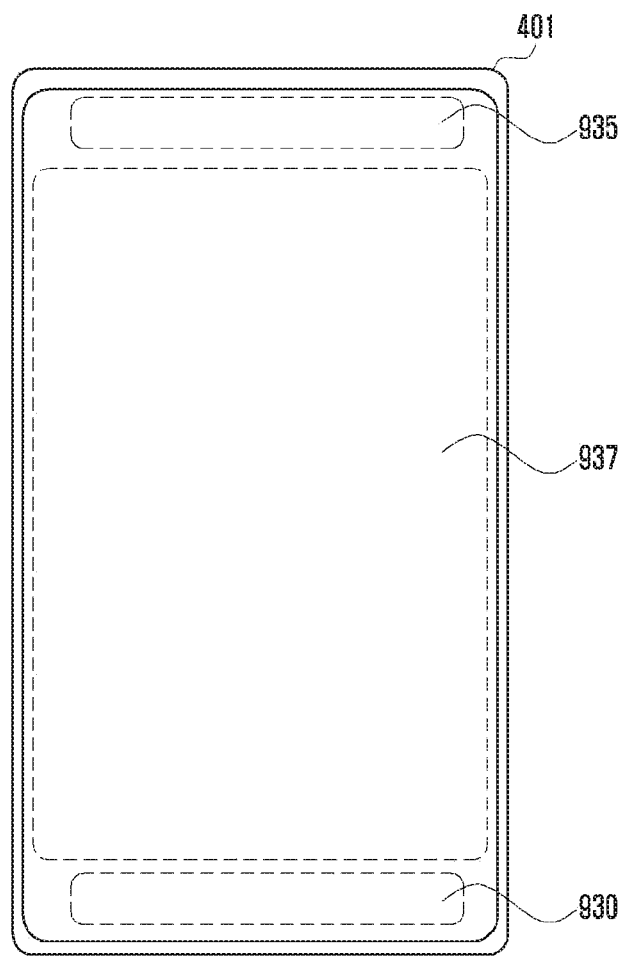

FIGS. 9A and 9B are diagrams illustrating an electronic device having a plurality of ultrasonic sensors according to various embodiments of the present disclosure.

The electronic device (e.g., the electronic device 401) according to various embodiments may include at least three ultrasonic sensors. For convenience of description, a disposition structure of ultrasonic sensors is illustrated, but a disposition location and size of each ultrasonic sensor may be implemented into various forms. The electronic device 401 according to various embodiments may include constituent elements constituting the same and a housing for protecting the constituent elements. For example, the electronic device 401 may include three ultrasonic sensors 930, 935, and 937 disposed in a structure of FIG. 9A. FIG. 9A is a cross-sectional view of a display module including ultrasonic sensors, and FIG. 9B illustrates an upper surface of the electronic device 401 in which ultrasonic sensors are formed. In FIG. 9B, a dotted line portion indicates a disposition area of each ultrasonic sensor, but for convenience of description, reference numerals corresponding to reference numerals of ultrasonic sensors are given to the area. That is, as shown in FIG. 9A, when viewed from an upper surface, a window 910 of the electronic device may be divided into a disposition area of the first ultrasonic sensor 930, a disposition area of the second ultrasonic sensor 935, and a disposition area of the third ultrasonic sensor 937 and having a size corresponding to a touch detection area. This is represented with a dotted line for convenience of description and is not visually divided.

In a cross-sectional view of FIG. 9A, in the electronic device 401, the window 910 may be located at an uppermost portion of a touch panel 920, the first ultrasonic sensor 930, and the second ultrasonic sensor 935 on a lower surface thereof. In this case, the window 910 may have a relatively larger area than that of the touch panel 920 and a display 940.

According to various embodiments, the electronic device 401 may control some of three ultrasonic sensors to operate in at least one mode of a receiver mode that outputs a sound of an audible frequency and a generation mode that generates ultrasonic waves and control some other ultrasonic sensors to operate in a receiving mode that receives ultrasonic waves.

According to various embodiments, the electronic device 401 may control an ultrasonic sensor operating in a receiving mode to use as an ultrasonic fingerprint sensor that authenticates a user fingerprint.

According to various embodiments, the electronic device 401 may change a mode of a plurality of ultrasonic sensors to operate in a speaker mode that generates an audible frequency. In an example, an ultrasonic sensor that may have a mode thereof changed in order to operate in a speaker mode may be disposed at a side of the display instead of a lower surface of the display in order to generate a specific volume or more.

Figure 10A:
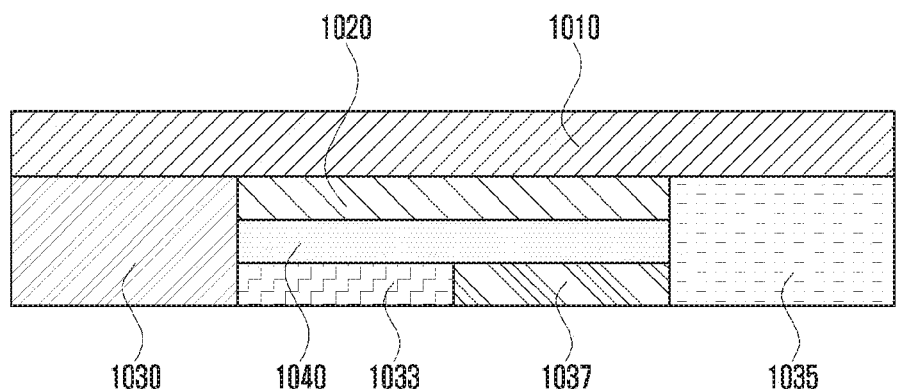
FIGS. 10A and 10B are diagrams illustrating an electronic device having a plurality of ultrasonic sensors according to various embodiments of the present disclosure.
Figure 10B:
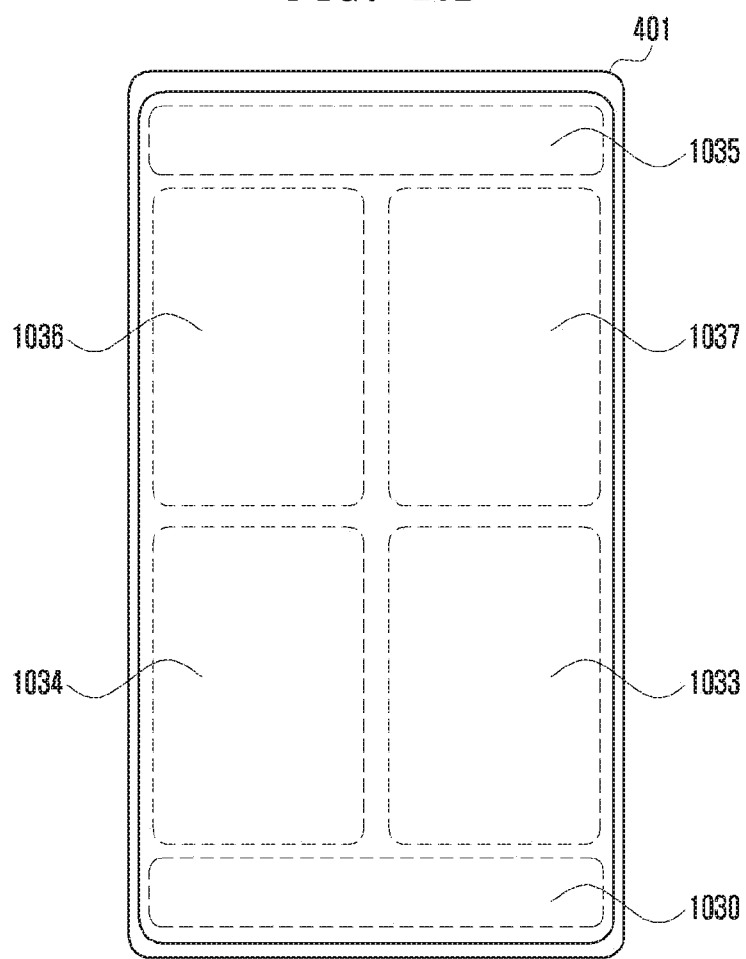

FIGS. 10A and 10B are diagrams illustrating an electronic device having a plurality of ultrasonic sensors according to various embodiments of the present disclosure.

According to an embodiment, the electronic device 401 may select an ultrasonic sensor to operate in a receiving mode that receives ultrasonic waves or may change a mode of an ultrasonic sensor in order to enable the ultrasonic sensor to operate in a receiving mode among a plurality of ultrasonic sensors according to a specific condition occurrence or situation information thereof.

For another example, the electronic device (e.g., the electronic device 401) may have 6 ultrasonic sensors, as in a structure of FIGS. 10A and 10B. In this case, the electronic device (e.g., the electronic device 401) may control at least two ultrasonic sensors to operate in a receiving mode among a plurality of ultrasonic sensors and control to change a mode of an ultrasonic sensor in order to enable the ultrasonic sensor to operate in a receiving mode according to a specific condition occurrence or situation information thereof.

FIG. 10A is a cross-sectional view of a display module including an ultrasonic sensor, and FIG. 10B illustrates an upper surface of an electronic device in which an ultrasonic sensor is formed. In FIG. 10B, a dotted line portion indicates a disposition area of each ultrasonic sensor, but for convenience of description reference numerals corresponding to reference numerals of ultrasonic sensors are given to the area. That is, an area designated by a dotted line at an upper surface of FIG. 10B may be a disposition area of a first ultrasonic sensor 1030, a disposition area of a second ultrasonic sensor 1035, a disposition area of a third ultrasonic sensor 1033, a disposition area of a fourth ultrasonic sensor 1037, a disposition area of a fifth ultrasonic sensor 1034, and a disposition area of a sixth ultrasonic sensor 1036.

In an example, when executing a function of an application, the electronic device 401 may control only a second ultrasonic sensor to operate in a receiving mode; and when executing a function of a music reproduction application, the electronic device 401 may control the second, fourth, and fifth ultrasonic sensors to operate in a speaker mode or a receiving mode.

In another example, when the first ultrasonic sensor 1030 of a plurality of ultrasonic sensors receives a request related to a second function while operating in a receiving mode in relation to a first function, the electronic device 401 may control to change a mode of the first ultrasonic sensor 1030 from a receiving mode to a generation mode to operate the first ultrasonic sensor 1030 in a generation mode and control to change a mode of the third ultrasonic sensor 1033 to a receiving mode.

FIGS. 11A, 11B, 11C, and 11D are diagrams illustrating a fingerprint recognition operation of an electronic device having a plurality of ultrasonic sensors according to various embodiments of the present disclosure.

Figure 11A:
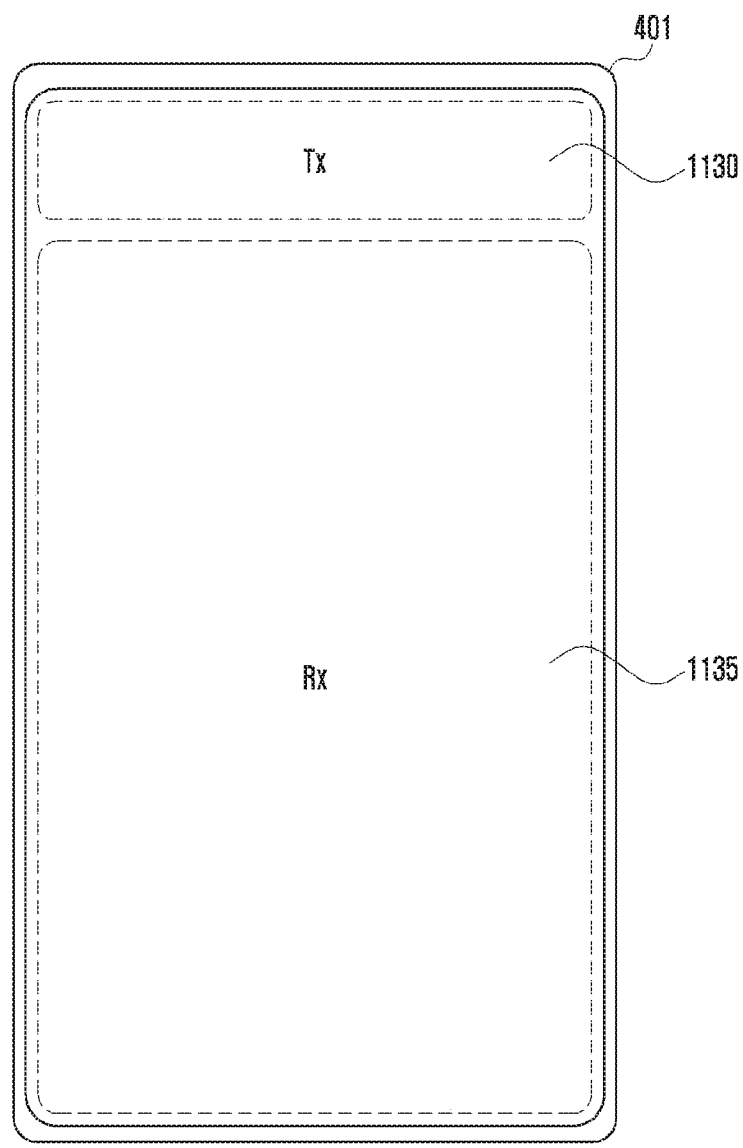
FIGS. 11A, 11B, 11C, and 11D are diagrams illustrating a fingerprint recognition operation of an electronic device having a plurality of ultrasonic sensors according to various embodiments of the present disclosure.

Referring to FIGS. 11A, 11B, 11C, and 11D, in the electronic device (e.g., the electronic device 401) according to various embodiments, as shown in FIG. 11A a first ultrasonic sensor 1130 may be disposed at a partial area and a second ultrasonic sensor 1135 may be disposed at another partial area. Here, the first ultrasonic sensor 1130 may operate in a generation mode, and the second ultrasonic sensor 1135 may operate in a receiving mode. A disposition structure of a plurality of ultrasonic sensors may be changed according to a display type and the present disclosure is not limited thereto.

Figure 11B:
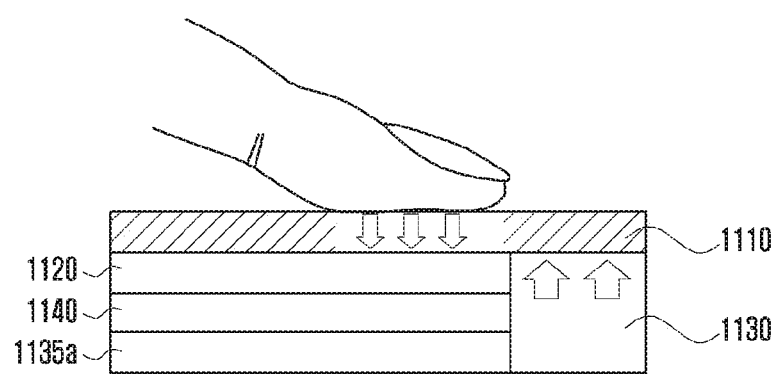
Figure 11C:
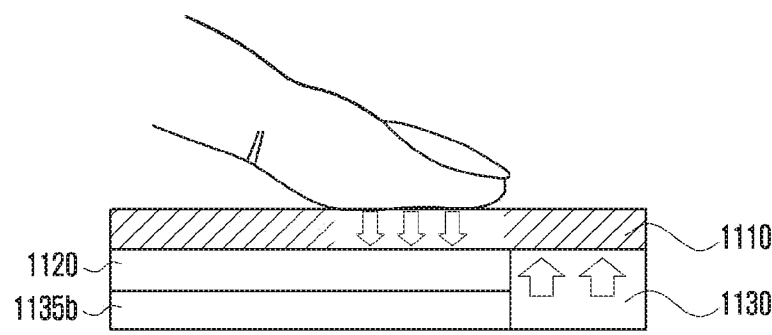
Figure 11D:
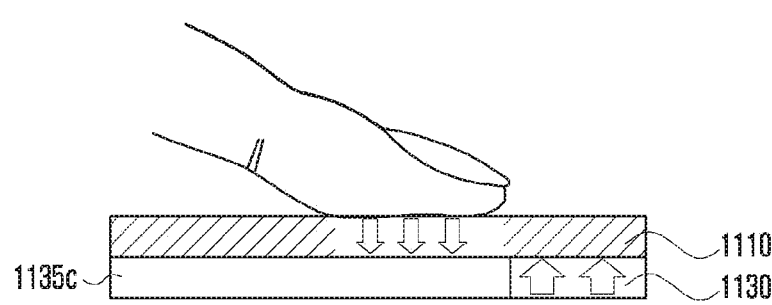

When the electronic device has two ultrasonic sensors of the first ultrasonic sensor 1130 and the second ultrasonic sensor 1135, as shown in a disposition structure of FIG. 11B, a window 1110, touch panel 1120, and display 1140 may be sequentially layered, a second ultrasonic sensor 1135a may be disposed at a lower portion of the display, and the first ultrasonic sensor 1130 may be disposed at an area different from a disposition area of the second ultrasonic sensor 1135a. In another example, as shown in a disposition structure of FIG. 11C, at a lower portion of a touch panel 1120, a second ultrasonic sensor 1135b may be disposed in an in-cell structure in the display. In another example, as shown in a disposition structure of FIG. 11D, a second ultrasonic sensor 1135c may be located at the same layer as that of the display (not shown) or may be located at a side of the display.

As in the above-described structures, the electronic device may distinguish an ultrasonic sensor operating in a receiving mode and an ultrasonic sensor operating in a generation mode among a plurality of ultrasonic sensors and control to display a predetermined image that indicates a biometric information recognition area in a display area corresponding to a disposition area of the ultrasonic sensor operating in a receiving mode.

For example, ultrasonic waves generated in the first ultrasonic sensor 1130 operating in a generation mode may be transferred through a window and be reflected by a user body (e.g., finger) that has contacted a biometric information recognition area to be received in the second ultrasonic sensor 1135 located at a lower portion of the display. Accordingly, the second ultrasonic sensor 1135 in a receiving mode may convert an ultrasonic signal reflected by a valley and a crest of a user fingerprint to a digital value representing signal strength and convert the converted digital value to an image to obtain the user's biometric information (e.g., a fingerprint image or fingerprint data). The second ultrasonic sensor 1135 may transfer the user's biometric information to the processor (e.g., the processor 410) electrically connected thereto. The processor 410 may compare the user's biometric information transferred from the ultrasonic sensor with the user's biometric information stored at the memory (e.g., the memory 430) and determine whether the user's biometric information is biometric information of a user having the authority to perform biometric information authentication.

Figure 12A:
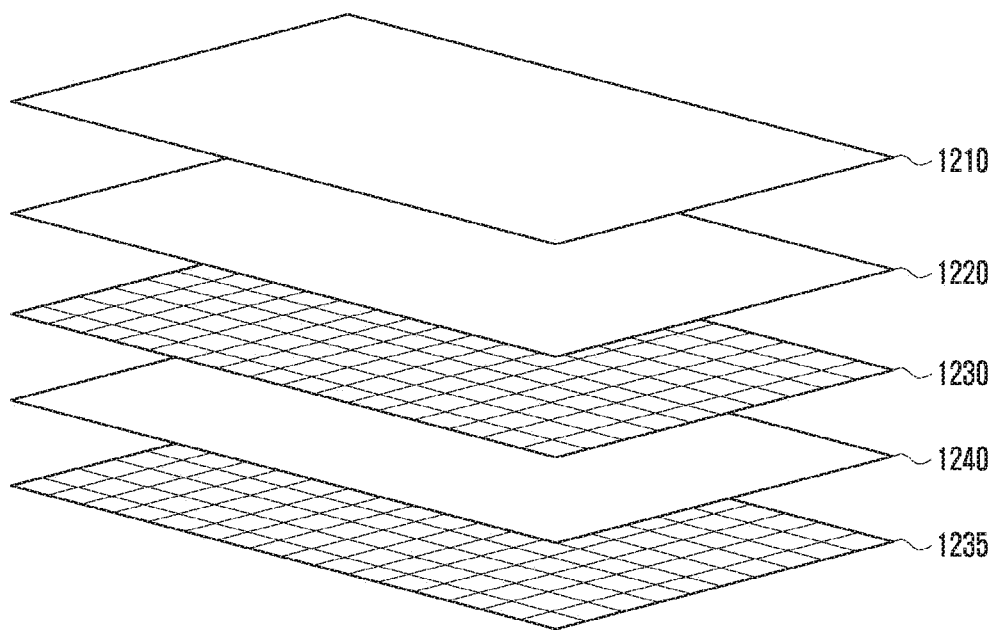
FIGS. 12A and 12B are diagrams illustrating a layer structure having a plurality of ultrasonic sensors according to various embodiments of the present disclosure.
Figure 12B:
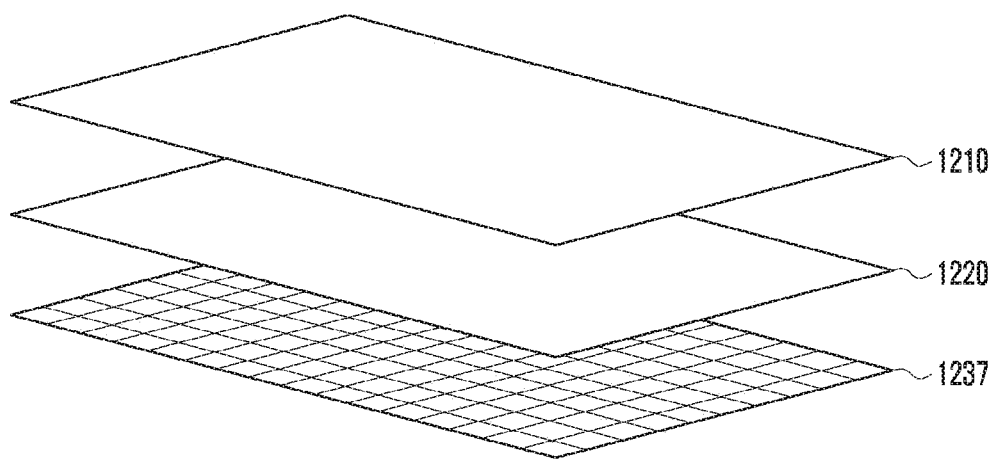

FIGS. 12A and 12B are diagrams illustrating a layer structure having a plurality of ultrasonic sensors according to various embodiments of the present disclosure.

Referring to FIGS. 12A and 12B, an ultrasonic sensor may be disposed at a lower surface of a display according to various embodiments of the present disclosure or an ultrasonic sensor may be disposed in an in-cell structure in the display. In an example, a layer structure in which an ultrasonic sensor is disposed at a lower surface of the display may be a layer structure of a window 1210, touch panel 1220, first ultrasonic sensor 1230, display 1240, and second ultrasonic sensor 1235, as shown in FIG. 12A. Here, any one of the first ultrasonic sensor 1230 and the second ultrasonic sensor 1235 may operate in a receiving mode that receives ultrasonic waves according to a specific condition occurrence or a state of the electronic device.

In order to convert a received ultrasonic signal to the user's biometric information (e.g., fingerprint information or fingerprint image), the first ultrasonic sensor 1230 and the second ultrasonic sensor 1235 may include at least one block or pixel. In another example, a structure in which an ultrasonic sensor is disposed in an in-cell structure in the display may be a layer structure of a window 1210, a touch panel 1220, and a display and sensor integrated module 1237 in which an ultrasonic sensor operating in a receiving mode is disposed in an in-cell structure in the display, as shown in FIG. 12B.

In order to convert a received ultrasonic signal to the user's biometric information (e.g., fingerprint information or fingerprint image), an ultrasonic sensor according to various embodiments may include at least one block or pixel.

Figures 13A, 13B, 13C:
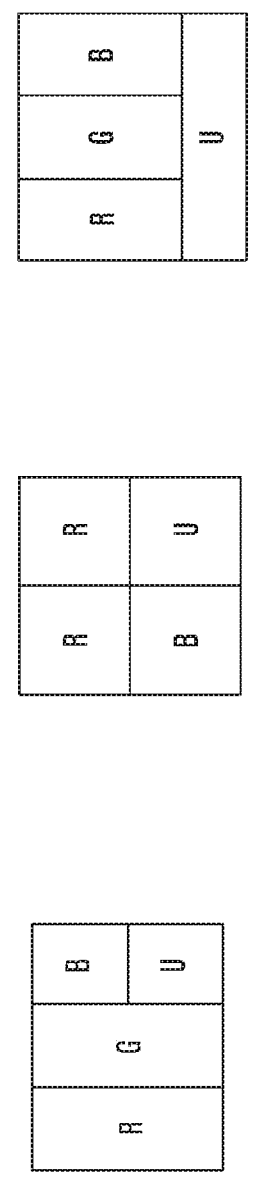

FIGS. 13A, 13B, and 13C are diagrams illustrating a pixel structure of ultrasonic sensors according to various embodiments of the present disclosure.

Referring to FIGS. 13A, 13B, and 13C, in the electronic device according to various embodiments, an ultrasonic sensor disposed in an in-cell structure in the display may be formed in a structure in which each pixel group constituting the display includes an ultrasonic receiving pixel or an ultrasonic generation pixel together with light emitting pixels. When viewing an enlarged view of one pixel constituting the display, the display may include a plurality of pixel groups. Each pixel group may include an ultrasonic pixel U (e.g., ultrasonic receiving pixel or ultrasonic generation pixel) that receives or generates ultrasonic waves together with red R, green G, and blue B light emitting pixels. In an example, in a pixel group of a disposition structure of FIG. 13A, the blue light emitting pixel B and the ultrasonic pixel U may have a relatively smaller size than that of the red light emitting pixel R and the green light emitting pixel G.

In another example, pixels of the display having a disposition structure of FIG. 13B may have an RGBU pattern, and a portion of the green pixel G may be replaced with the ultrasonic pixel U. In another example, in pixels of the display having a disposition structure of FIG. 13C, green G, red R, and blue B light emitting pixels may be disposed in the same size, and the ultrasonic pixel U may have a size different from that of the light emitting pixels and be included in one pixel group.

According to various embodiments, the ultrasonic pixel U may be included in a partial area instead of an entire area of the display. For example, when the ultrasonic sensor should be disposed at an upper end portion or a lower end portion of the display, only pixels disposed at an upper end area and a lower end area of the display may include an ultrasonic pixel, and pixels of a central area of the display may include only red R, green G, and blue B light emitting pixels including no ultrasonic pixel U.

Figure 14A:
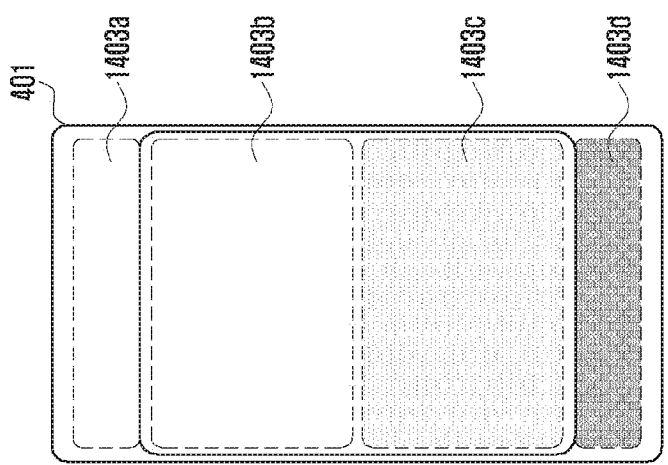
FIGS. 14A, 14B, and 14C are diagrams illustrating a selective use method of a plurality of ultrasonic sensors in an electronic device according to various embodiments of the present disclosure.
Figure 14A:
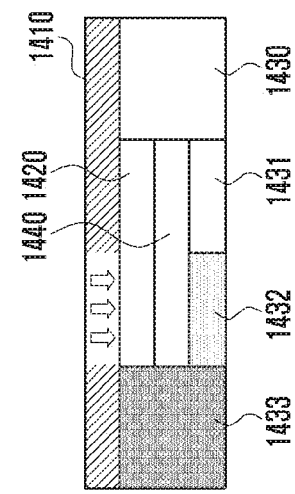
Figure 14B:
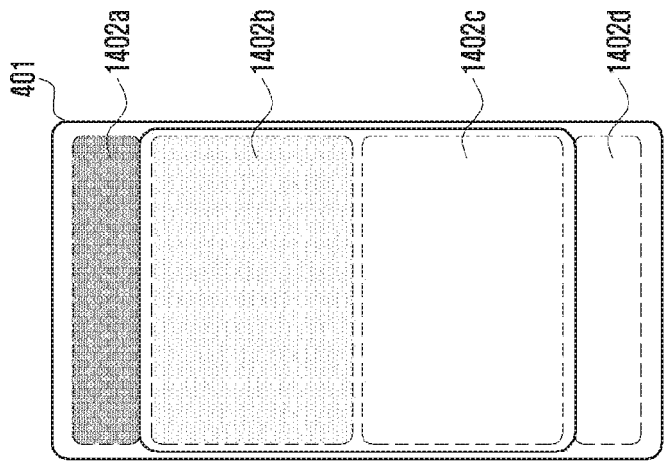
Figure 14B:
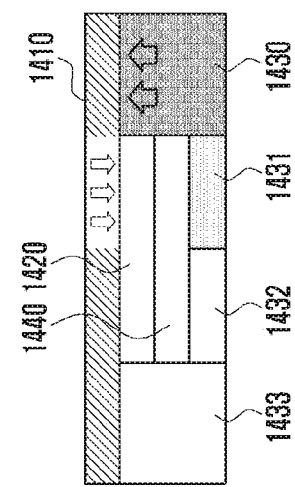
Figure 14C:
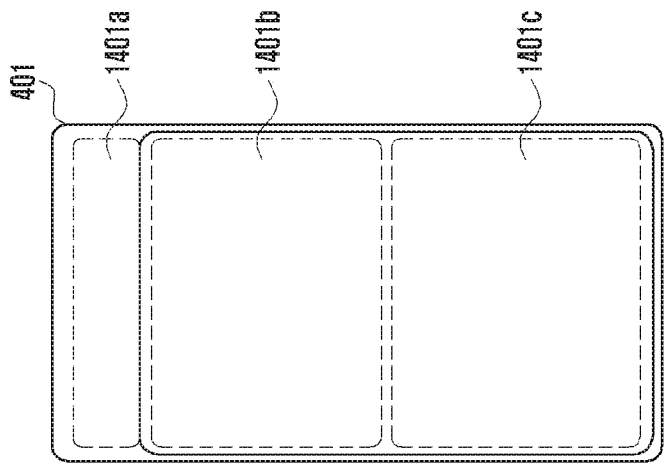
Figure 14C:
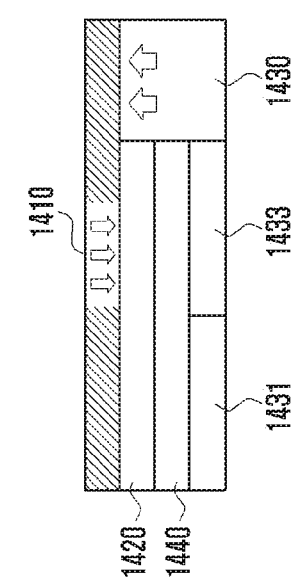

FIGS. 14A, 14B, and 14C are diagrams illustrating a selective use method of a plurality of ultrasonic sensors in an electronic device according to various embodiments of the present disclosure.

According to various embodiments, the electronic device (e.g., the electronic device 401) may determine an operation mode of an ultrasonic sensor and control to change an operation mode of the ultrasonic sensor provided therein to a first operation mode or a second operation mode according to a specific condition occurrence or situation information thereof. An operation mode of the ultrasonic sensor may be at least one of a generation mode that generates ultrasonic waves, a receiving mode that receives ultrasonic waves, and a receiver/speaker mode that outputs a sound of an audible frequency.

According to an embodiment, referring to FIG. 14A, the electronic device 401 may include a first ultrasonic sensor 1430, second ultrasonic sensor 1431, and third ultrasonic sensor 1432. In FIG. 14A, a dotted line portion indicates a disposition area of each ultrasonic sensor and may be divided into a disposition area 1401a of the first ultrasonic sensor 1430, a disposition area 1401b of the second ultrasonic sensor 1431, and a disposition area 1401c of the third ultrasonic sensor 1432. This is represented with a dotted line for convenience of description and is not visually divided. The second ultrasonic sensor 1431 and the third ultrasonic sensor 1432 may be disposed at a lower portion of a structure in which a window 1410, touch panel 1420, and display 1440 are sequentially layered.

The electronic device 401 having a structure of FIG. 14A may enable the first ultrasonic sensor 1430 to operate in a generation mode that generates ultrasonic waves and enable the second ultrasonic sensor 1431 and the third ultrasonic sensor 1432 to operate in a receiving mode that receives ultrasonic waves. The electronic device 401 may apply a voltage to the first ultrasonic sensor 1430 to enable a piezoelectric element to vibrate and to vibrate the window to generate ultrasonic waves. The electronic device 401 may receive ultrasonic waves reflected by a user fingerprint that has contacted an upper portion of a disposition area of the second ultrasonic sensor 1431 or the third ultrasonic sensor 1432 to obtain the user's fingerprint information, thereby performing ultrasonic fingerprint authentication.

According to an embodiment, the electronic device 401 may control at least one of the second ultrasonic sensor 1431 and the third ultrasonic sensor 1432 to operate in a receiving mode for fingerprint authentication according to a situation thereof. While the electronic device 401 executes a specific application, the electronic device may control a display area corresponding to a disposition area of the third ultrasonic sensor 1432 to display a screen related to a specific application and control a display area corresponding to a disposition area of the second ultrasonic sensor 1431 to display at least one image representing a biometric information recognition area for fingerprint authentication. The electronic device 401 may perform fingerprint authentication using the second ultrasonic sensor 1431.

According to another embodiment, as shown in FIGS. 14B and 14C, the electronic device 401 may include four ultrasonic sensors of a first ultrasonic sensor 1430, second ultrasonic sensor 1431, third ultrasonic sensor 1432, and fourth ultrasonic sensor 1433. As shown in FIGS. 14B and 14C, a dotted line portion indicates a disposition area of each ultrasonic sensor and may be divided into disposition areas 1402a and 1403a of the first ultrasonic sensor 1430, disposition areas 1402b and 1403b of the second ultrasonic sensor 1431, disposition areas 1402c and 1403c of the third ultrasonic sensor 1432, and disposition areas 1402d and 1403d of the fourth ultrasonic wave 1433.

The electronic device 401 may control any one of the first ultrasonic sensor 1430 and the fourth ultrasonic sensor 1433 to operate in a generation mode that generates ultrasonic waves and control any one of the second ultrasonic sensor 1431 and the third ultrasonic sensor 1432 to operate in a receiving mode that receives ultrasonic waves.

In an example, referring to FIG. 14B, when the electronic device 401 changes a mode of the first ultrasonic sensor 1430 to a generation mode and when the first ultrasonic sensor 1430 generates ultrasonic waves, the electronic device 401 may change a mode of the second ultrasonic sensor 1431 adjacent to the first ultrasonic sensor 1430 to a receiving mode to perform fingerprint authentication. In this case, the electronic device may control the display area 1402b corresponding to a disposition area of the second ultrasonic sensor 1431 to display at least one image representing a biometric information recognition area for fingerprint authentication.

However, referring to FIG. 14C, when the electronic device 401 changes a mode of the fourth ultrasonic sensor 1433 to a generation mode and when the fourth ultrasonic sensor 1433 generates ultrasonic waves, the electronic device 401 may change a mode of the third ultrasonic sensor 1432 adjacent to the fourth ultrasonic sensor 1433 to a receiving mode to perform fingerprint authentication. In this case, the electronic device 401 may control the display area 1403c corresponding to a disposition area of the third ultrasonic sensor 1432 to display at least one image representing a biometric information recognition area for fingerprint authentication.

According to various embodiments, when the first ultrasonic sensor operates in a speaker/receiver mode, the electronic device 401 may perform fingerprint authentication using the third ultrasonic sensor and/or the fourth ultrasonic sensor. An operation mode of the ultrasonic sensor provided in the electronic device 401 may be changed by various conditions, for example, screen information about an executing application and operation information about each ultrasonic sensor, but the present disclosure is not limited thereto and a condition may be changed according to setup.

Figure 15A:
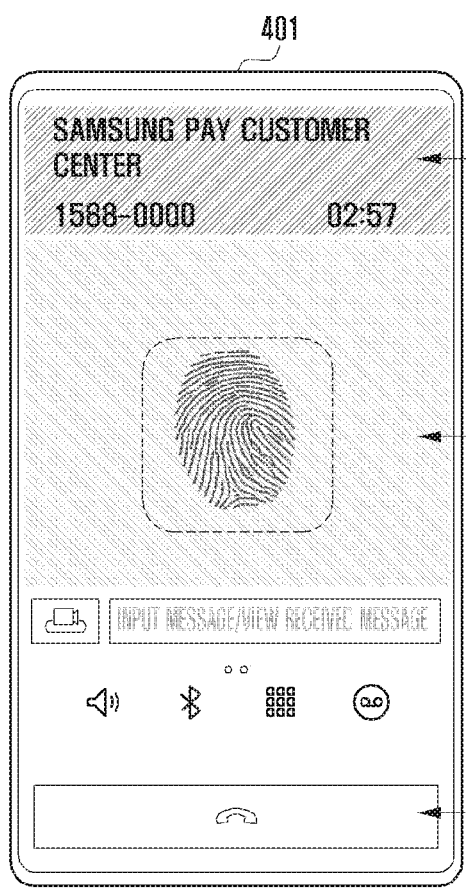
FIGS. 15A and 15B are diagrams illustrating a fingerprint recognition situation of an electronic device according to various embodiments of the present disclosure.
Figure 15B:
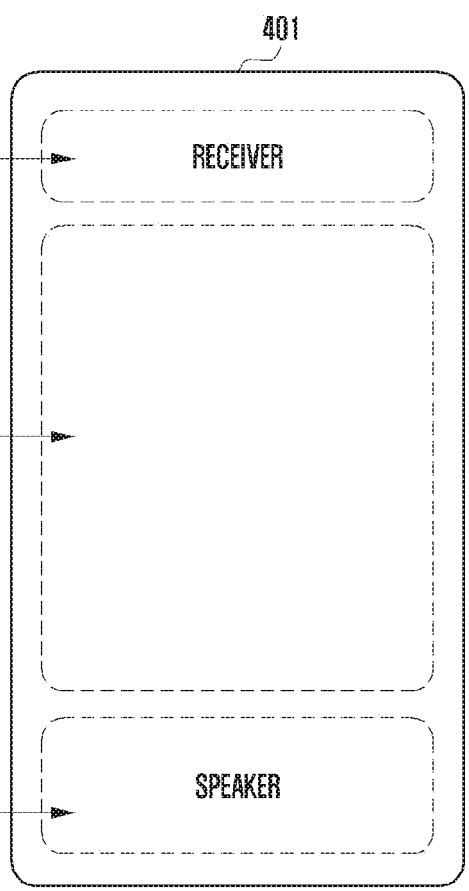

FIGS. 15A and 15B are diagrams illustrating a fingerprint recognition situation of an electronic device according to various embodiments of the present disclosure.

Referring to FIGS. 15A and 15B, an electronic device (e.g., the electronic device 401) according to various embodiments of the present disclosure may use an ultrasonic sensor in a receiver mode/speaker mode that outputs/receives a sound signal of an audible frequency band in addition to an ultrasonic generation/reception mode. The electronic device 401 may control to change an operation mode of each ultrasonic sensor according to a predetermined method and to perform a function corresponding to a changed operation mode.

According to an embodiment, the electronic device 401 may request a user authentication function for personal information protection and payment information exchange while executing another function thereof. For example, by connecting a communication channel with an electronic device of another party, the electronic device 401 may be in a call connection state. In this case, the electronic device 401 may control some of a plurality of ultrasonic sensors to operate in a receiver mode/speaker mode for transmitting and receiving a sound signal in an audible frequency band. In a state in which a call is connected with an electronic device of another party (e.g., Samsung pay customer center), the electronic device of another party may transmit a signal that requests authentication of a user of the electronic device to the electronic device. The electronic device 401 may determine an ultrasonic sensor operating in a receiver/speaker mode and select an ultrasonic sensor to use in a receiving mode.

Accordingly, as shown in FIG. 15A, the electronic device 401 may control to display a screen that guides biometric information authentication for user authentication in a display of a disposition area of an ultrasonic sensor to correspond to the disposition area of the ultrasonic sensor selected as a receiver of an ultrasonic signal on a communicating connection screen.

For example, as shown in FIGS. 15A and 15B, the electronic device may be divided into a disposition area of a first ultrasonic sensor 1510, a disposition area of a second ultrasonic sensor 1520, and a disposition area of a third ultrasonic sensor 1530. In a state in which a communicating function is activated, the electronic device 401 may control the first ultrasonic sensor 1510 and the third ultrasonic sensor 1530 to operate in a receiver/speaker mode that outputs an audible frequency. For example, in a state in which a communicating function of the electronic device 401 is activated, when a situation to change a mode of an ultrasonic sensor to a generation mode occurs, the electronic device 401 may control to change a mode of the first ultrasonic sensor 1510 from a speaker mode to a generation mode. In a state in which a communicating function is activated, when a situation to change a mode of an ultrasonic sensor to a generation mode occurs, for example, when a user authentication determination request signal occurs, the electronic device 401 may control the third ultrasonic sensor 1530 to operate in a generation mode that generate ultrasonic waves and control the second ultrasonic sensor 1520 to operate in a receiving mode that receives ultrasonic waves.

The electronic device 401 may selectively use the first ultrasonic sensor 1510 and the third ultrasonic sensor 1530 to output a voice signal to an electronic device of another party, vibrate glass through generation of an ultrasonic signal, and receive reflected ultrasonic waves of ultrasonic waves generated in the first ultrasonic sensor or the third ultrasonic sensor using the second ultrasonic sensor 1520 to perform fingerprint authentication. The electronic device 401 compares fingerprint information obtained through the second ultrasonic sensor 1520 with user biometric information stored at the memory and, when the authority of the user is authenticated, the electronic device may provide information notifying that user authentication has been determined to an electronic device of another party. The user can easily perform user authentication while communicating without a separate user authentication process.

According to various embodiments, the electronic device 401 may selectively change an operation mode of the first ultrasonic sensor 1510, the second ultrasonic sensor 1520, and the third ultrasonic sensor 1530 according to a predetermined method. The electronic device 401 may change a display location of a screen that guides biometric information authentication for user authentication according to an operation mode of the ultrasonic sensor.

According to another embodiment, the electronic device 401 may determine information about a location in which a user finger has contacted using a touch panel functionally connected thereto, a touchscreen, or a second ultrasonic sensor that detects a vibration change upon contacting and display a screen that guides biometric information authentication of fingerprint recognition on the display to correspond to the determined location.

FIGS. 16A, 16B, 16C, and 16D are diagrams illustrating a fingerprint recognition situation of an electronic device according to various embodiments of the present disclosure.

Referring to FIGS. 16A, 16B, 16C, and 16D, the electronic device according to various embodiments may control some of a plurality of ultrasonic sensors to operate in a speaker mode that outputs a sound of an audible frequency band other than an ultrasonic band. In a state in which the ultrasonic sensor is used in a speaker mode, when a predetermined condition (e.g., a high sound request signal of a predetermined threshold value or more) occurs, the electronic device may select at least two ultrasonic sensors and control the at least two ultrasonic sensors to operate in a speaker mode. Further, when the electronic device should control the one ultrasonic sensor while operating in a speaker mode to operate in an ultrasonic receiving mode, the electronic device may control to change a mode of the ultrasonic sensor from a speaker mode to a receiving mode and control an ultrasonic sensor of another location to operate in a speaker mode.

For example, in a state in which a music reproduction application is executed, when a situation requiring user authentication occurs, as in digital writing management contents, the electronic device may control to display a screen that guides biometric information authentication for user authentication in a display of a disposition area of an ultrasonic sensor.

Figure 16A:
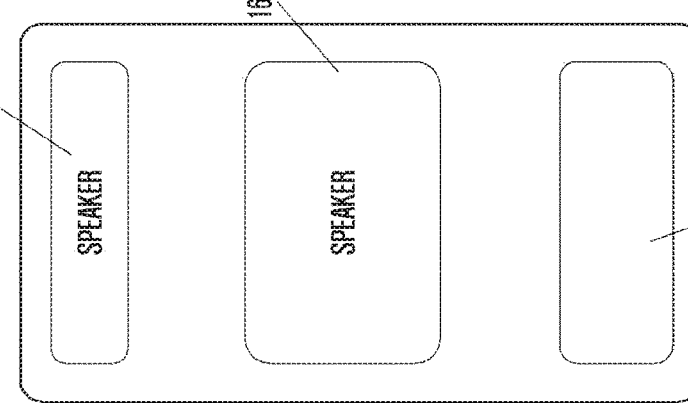
FIGS. 16A, 16B, 16C, and 16D are diagrams illustrating a fingerprint recognition situation of an electronic device according to various embodiments of the present disclosure.

For example, an electronic device of FIG. 16A may include a first ultrasonic sensor 1610, second ultrasonic sensor 1620, and third ultrasonic sensor 1630. Here, for convenience of description, areas are divided, but a disposition area of the first ultrasonic sensor 1610, second ultrasonic sensor 1620, and third ultrasonic sensor 1630 is not visually represented.

Figure 16B:
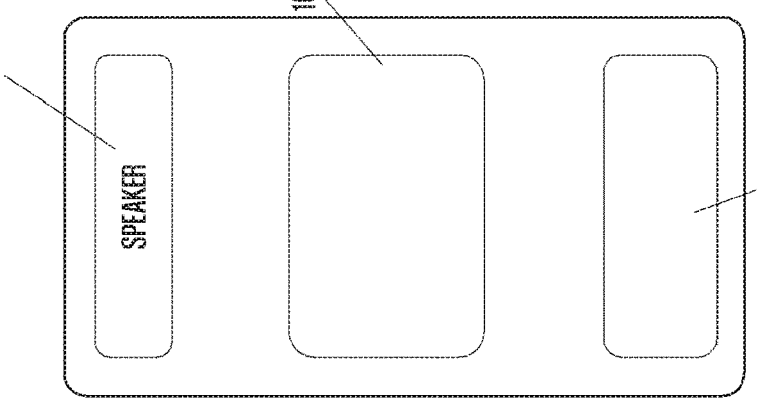
Figure 16C:
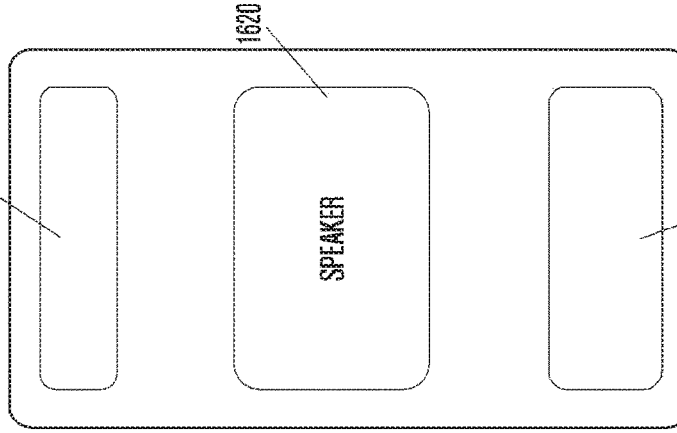
Figure 16D:
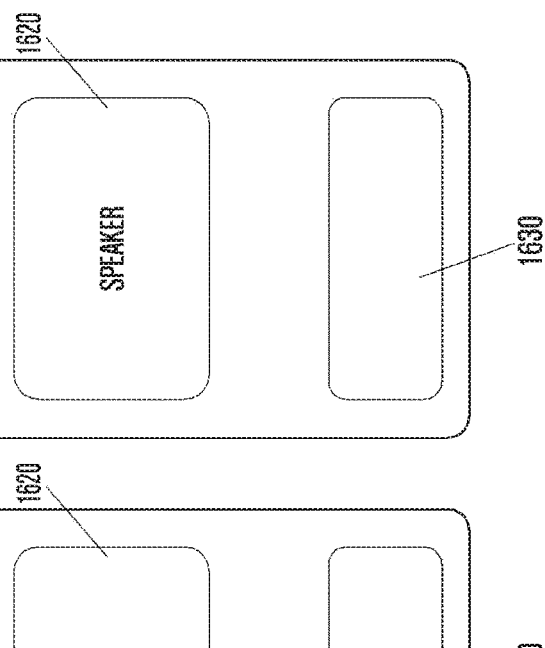

The electronic device having the first ultrasonic sensor 1610, second ultrasonic sensor 1620, and third ultrasonic sensor 1630 may control the second ultrasonic sensor 1620 to operate in a speaker mode as shown in FIG. 16B or may control the first ultrasonic sensor 1610 to operate in a speaker mode as shown in FIG. 16C according to situation information thereof. Alternatively, as shown in FIG. 16D, when the electronic device should output a sound to a volume larger than a predetermined sound setup value upon reproducing music, the electronic device may control the first ultrasonic sensor 1610 and the second ultrasonic sensor 1620 to operate in a speaker mode.

When the electronic device should guide biometric information authentication for user authentication upon reproducing music, the electronic device may change a mode of other ultrasonic sensors, except for an ultrasonic sensor operating in a speaker mode among a plurality of ultrasonic sensors to a receiving mode for user authentication and control to display a screen that guides biometric information authentication in a display area in which the ultrasonic sensor changed to a receiving mode is disposed.

Figure 17:
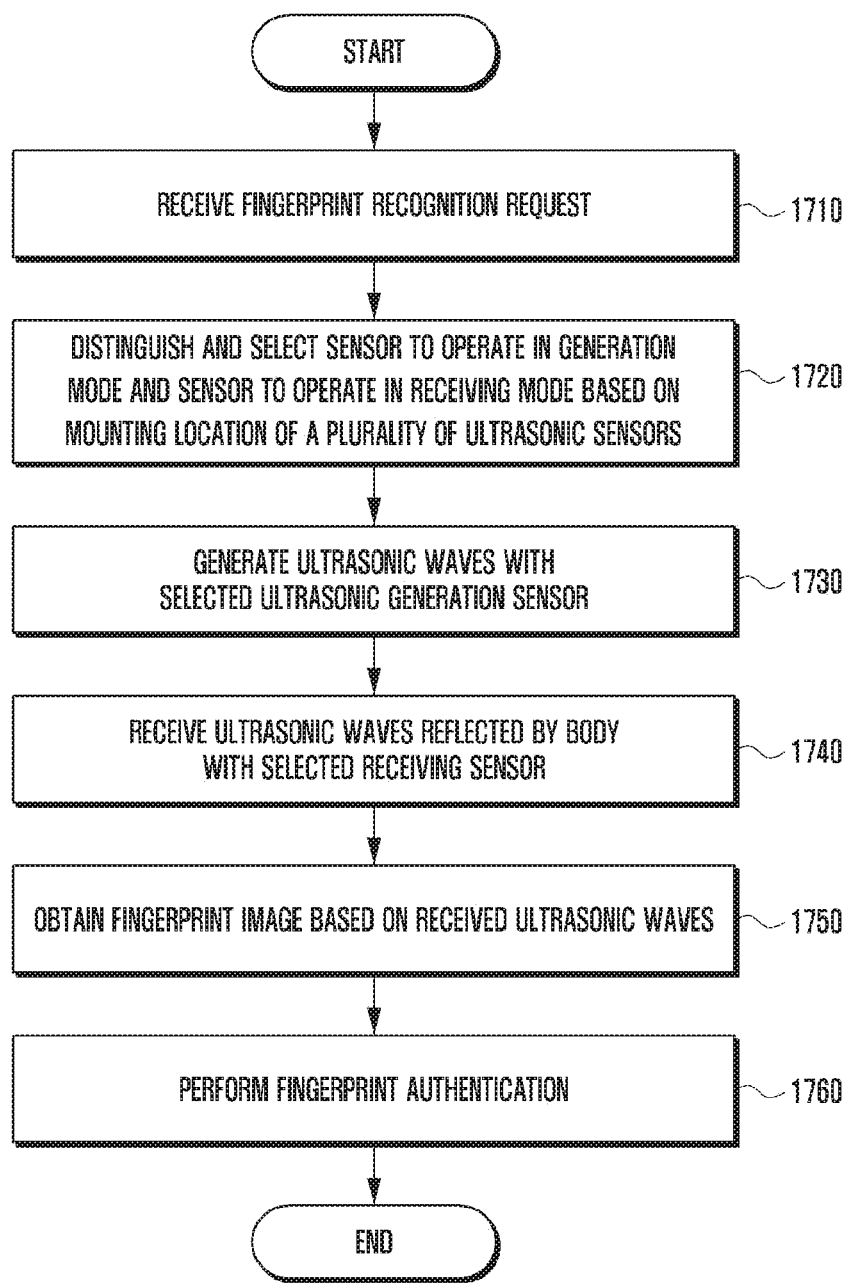
FIG. 17 is a flowchart illustrating a method of authenticating biometric information of an electronic device according to various embodiments of the present disclosure.

FIG. 17 is a flowchart illustrating a method of authenticating biometric information of an electronic device according to various embodiments of the present disclosure.

Referring to FIG. 17, the electronic device (e.g., the electronic device 401 or the processor 410 of the electronic device) according to various embodiments may receive a fingerprint recognition request at operation 1710. For example, the fingerprint recognition request may be a request signal by a user input and may be a request signal from another electronic device. For example, when fingerprint recognition is set as an authentication method for lock release in a lock state, the electronic device 401 may recognize that a fingerprint recognition request has occurred in response to a user's lock release request. Alternatively, when the electronic device 401 receives a user authentication determination request from another electronic device or when a request signal that allows only access of a user having authority occurs, the electronic device 401 may recognize that a fingerprint recognition request has occurred. The fingerprint recognition request may be changed according to setup, and the electronic device may receive a fingerprint recognition request in various situations.

The electronic device 401 may, at operation 1720, distinguish and select a sensor to operate in a generation mode and a sensor to operate in a receiving mode based on a mounting location among a plurality of ultrasonic sensors in response to reception of a fingerprint recognition request.

For example, the electronic device 401 may select an ultrasonic sensor to operate in a generation mode and an ultrasonic sensor to operate in a receiving mode using at least one of a current operation mode of each of ultrasonic sensors, executing application information, and situation information. Here, as an ultrasonic sensor to operate in a generation mode and a receiving mode, the electronic device 401 may select different ultrasonic sensors or may select the same sensor.

The electronic device 401 may apply a voltage to the ultrasonic sensor selected to operate in a generation mode to generate ultrasonic waves at operation 1730. In this case, the electronic device 401 may control to display a screen that guides fingerprint authentication in a display area in which the ultrasonic sensor selected to operate in a receiving mode is disposed. Accordingly, the user may contact the user's hand at an upper surface of a display area corresponding to a disposition location of the ultrasonic sensor selected to operate in a receiving mode through a screen that guides fingerprint authentication.

The electronic device 401 may, at operation 1740, receive ultrasonic waves reflected by the user's hand (e.g., fingerprint) through a vibration by generated ultrasonic waves through the ultrasonic sensor operating in a receiving mode.

The electronic device 401 may, at operation 1750, obtain a user fingerprint image (or image) based on the received ultrasonic waves that were reflected from the user's hand.

The electronic device 401 may perform fingerprint authentication at operation 1760 based on the obtained fingerprint image. For example, the electronic device 401 may compare the obtained fingerprint image with user biometric information stored at the memory, and if the obtained fingerprint image corresponds to the user biometric information, the electronic device 401 may determine that the user is a user having authority and release lock or may perform an operation (e.g., payment approval) related to personal information or security information. If the obtained fingerprint image does not correspond to the user biometric information, the electronic device 401 may determine that the user is a user having no authority and block an operation (e.g., payment approval) related to personal information or security information or may control to stop an operation thereof.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, an electronic device that can detect a touch and a fingerprint in a display area can be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a housing comprising at least one portion of a surface of the electronic device;
   a first piezoelectric element formed at a partial area of the housing and configured to output a signal of a designated frequency band; and
   a second piezoelectric element formed at another partial area of the housing and configured to receive a reflection signal in which the signal output from the first piezoelectric element is reflected by an external object that has contacted the at least one portion of the housing,
   wherein the first piezoelectric element is disposed above a display of the electronic device, and the second piezoelectric element is disposed underneath the display.

2. The electronic device of claim 1, further comprising:
   at least one processor electrically connected to the first piezoelectric element and the second piezoelectric element,
   wherein the at least one processor is configured to:
   determine situation information related to the electronic device, set an operation mode of the first piezoelectric element to a first operation mode when the situation information corresponds to a first condition which involves fingerprint authentication, and set an operation mode of the first piezoelectric element to a second operation mode when the situation information corresponds to a second condition which does not involve fingerprint authentication.

3. The electronic device of claim 2, wherein, in the first operation mode, the designated frequency band comprises a frequency range corresponding to ultrasonic waves, and wherein, in the second operation mode, the designated frequency band is an audible frequency range.

4. The electronic device of claim 1, further comprising:

at least one processor electrically connected to the first piezoelectric element and the second piezoelectric element, wherein the at least one processor is further configured to generate image data of the external object based on at least the reflection signal.

5. The electronic device of claim 4, further comprising:

a display comprising at least one portion that is received in the housing, wherein the at least one processor is further configured to display a graphic object for inducing a contact in at least a partial area of the display corresponding to the second piezoelectric element.

6. The electronic device of claim 1, further comprising:

a third piezoelectric element for outputting a signal of the designated frequency band; and a fourth piezoelectric element for receiving the reflection signal, wherein the first piezoelectric element and the second piezoelectric element are adjacently disposed, and the third piezoelectric element and the fourth piezoelectric element are adjacently disposed.

7. The electronic device of claim 6, further comprising:

at least one processor, wherein the at least one processor is further configured to:

enable the second piezoelectric element to operate in an ultrasonic receiving mode when the first piezoelectric element operates in an ultrasonic generation mode, and enable the fourth piezoelectric element to operate in the ultrasonic receiving mode when the third piezoelectric element operates in the ultrasonic generation mode.

8. The electronic device of claim 1, wherein the first and second piezoelectric elements comprise at least one material of zirconate titanate ceramics (PZT), lead scandium tantalate (PST), Quartz, (Pb, Sm)TiO$_3$, PMN(Pb(MgNb)O$_3$)—PT (PbTiO$_3$), polyvinylidene fluoride (PVDF), and PVDF-TrFe.

9. An electronic device, comprising:

a housing comprising a surface of the electronic device;

a display;

a first piezoelectric element formed in at least a partial area of the housing;

a second piezoelectric element formed in another partial area of the housing; and at least one processor configured to:

determine situation information related to the electronic device, designate a mode of the first piezoelectric element to a first operation mode and a mode of the second piezoelectric element to a second operation mode based on at least the situation information, wherein the situation information comprises a fingerprint authentication situation, and perform a designated function using the first piezoelectric element and the second piezoelectric element, wherein the first operation mode corresponds to a generation mode, and the second operation mode corresponds to a receiving mode, and wherein the first piezoelectric element is disposed next to the display, and the second piezoelectric element is disposed underneath the display.

10. The electronic device of claim 9, wherein the at least one processor is further configured to:

output a signal of an ultrasonic frequency band using the first piezoelectric element, and receive a reflection signal reflected by an external object that has contacted at least one portion of the housing using the second piezoelectric element.

11. The electronic device of claim 10, wherein the at least one processor is further configured to generate fingerprint image of the external object based on at least the reflection signal.

12. An electronic device, comprising:

a touchscreen;

a plurality of ultrasonic sensors; and at least one processor electrically connected to the touchscreen, and the plurality of ultrasonic sensors, wherein the at least one processor is configured to:

select a first ultrasonic sensor from among the plurality of ultrasonic sensors, wherein the selected first ultrasonic sensor operates in a generation mode for outputting a signal of a designated frequency band, select a second ultrasonic sensor from among the plurality of ultrasonic sensors, based on at least one of a mounting location of the plurality of ultrasonic sensors, operation modes of the plurality of ultrasonic sensors, or an executed application information, wherein the selected second ultrasonic sensor operates in a receiving mode for receiving a signal of the designated frequency band, and perform a designated function using the selected first and second ultrasonic sensors, and wherein the at least one processor is further configured to control at least one of the first ultrasonic sensor or the second ultrasonic sensor to operate in a speaker mode, when an application associated with a sound output function is executed.

13. The electronic device of claim 12, wherein the plurality of ultrasonic sensors is configured to operate in at least one of a generation mode that generates ultrasonic waves, a receiving mode that receives ultrasonic waves, or a speaker mode that generates a sound of an audible frequency.

14. The electronic device of claim 12, wherein the at least one processor is further configured to display a user interface screen that guides biometric information authentication in at least a partial area of a display of the touchscreen corresponding to a disposition location of an ultrasonic sensor selected to the receiving mode.

15. The electronic device of claim 14, wherein the at least one processor is further configured to:

receive a reflection signal reflected by an external object that has contacted at least one portion of the display through another at least one ultrasonic sensor corresponding to the receiving mode, generate biometric information corresponding to the external object based on the reflection signal, and perform a biometric information authentication function based on the generated biometric information.

16. The electronic device of claim 12,
wherein the touchscreen comprises a display,
wherein the first ultrasonic sensor, among the plurality of ultrasonic sensors, is disposed at a side surface of the display, and
wherein the second ultrasonic sensor, among the plurality of ultrasonic sensors, is disposed at a lower surface of the display.

17. The electronic device of claim 12,
wherein the touch screen comprises a plurality of light emitting elements,
wherein the plurality of ultrasonic sensors includes a plurality of piezoelectric elements, and
wherein at least one portion of the plurality of piezoelectric elements is disposed between the plurality of light emitting elements.

* * * * *